US007853518B2

(12) United States Patent
Cagan

(10) Patent No.: US 7,853,518 B2
(45) Date of Patent: Dec. 14, 2010

(54) METHOD AND APPARATUS FOR ADVANCED MORTGAGE DIAGNOSTIC ANALYTICS

(75) Inventor: Christopher L. Cagan, Los Angeles, CA (US)

(73) Assignee: CoreLogic Information Solutions, Inc., Santa Ana, CA (US)

( * ) Notice: Subject to any disclaimer, the term of this patent is extended or adjusted under 35 U.S.C. 154(b) by 1354 days.

(21) Appl. No.: 11/135,778

(22) Filed: May 24, 2005

(65) Prior Publication Data

US 2006/0271472 A1    Nov. 30, 2006

(51) Int. Cl.
*G06Q 40/00* (2006.01)
(52) U.S. Cl. ......................................................... 705/38
(58) Field of Classification Search ........................ None
See application file for complete search history.

(56) References Cited

U.S. PATENT DOCUMENTS

| | | | |
|---|---|---|---|
| 4,870,576 A | 9/1989 | Tornetta | |
| 4,918,526 A | 4/1990 | Lewis et al. | |
| 5,032,989 A | 7/1991 | Tornetta | |
| 5,193,056 A | 3/1993 | Boes | |
| 5,361,201 A | 11/1994 | Jost et al. | |
| 5,414,621 A | 5/1995 | Hough | |
| 5,680,305 A | 10/1997 | Apgar, IV | |
| 5,754,850 A | 5/1998 | Janssen | |
| 5,794,216 A | 8/1998 | Brown | |
| 5,852,810 A | 12/1998 | Sotiroff et al. | |
| 5,857,174 A | 1/1999 | Dugan | |
| 5,867,155 A | 2/1999 | Williams | |
| 6,115,694 A | 9/2000 | Cheetham et al. | |
| 6,141,648 A | 10/2000 | Bonissone et al. | |
| 6,178,406 B1 | 1/2001 | Cheetham et al. | |
| 6,323,885 B1 | 11/2001 | Wiese | |
| 6,397,208 B1 | 5/2002 | Lee | |
| 6,401,070 B1 | 6/2002 | McManus et al. | |
| 6,484,176 B1 | 11/2002 | Sealand et al. | |
| 6,505,176 B2 | 1/2003 | DeFrancesco et al. | |
| 6,587,841 B1 | 7/2003 | DeFrancesco et al. | |
| 6,609,118 B1 | 8/2003 | Khedkar et al. | |
| 6,636,803 B1 | 10/2003 | Hartz, Jr. et al. | |
| 6,681,211 B1 | 1/2004 | Gatto | |
| 6,748,369 B2 | 6/2004 | Khedkar et al. | |

(Continued)

FOREIGN PATENT DOCUMENTS

JP    2001236369    8/2001

(Continued)

OTHER PUBLICATIONS

Keller, Paul & Pyzdek, Thomas. Six Sigma Demystified. McGraw-Hill Professional. 2004. pp. 3-4, 100-102, 147-148 and 291-292.*

(Continued)

*Primary Examiner*—Jason M Borlinghaus
(74) *Attorney, Agent, or Firm*—Snell & Wilmer L.L.P.

(57) ABSTRACT

A method and apparatus for calculating individual or collective safe scores for properties with loans. These safe scores are useful in comparing the risk of loss due to exposure in the case of a default on the loan or loans being evaluated and may be used to objectively compare individual loans or groups of loans for such risk and for the worthiness for refinancing or additional lending.

22 Claims, 16 Drawing Sheets

U.S. PATENT DOCUMENTS

| | | |
|---|---|---|
| 6,836,270 B2 | 12/2004 | Du |
| 6,842,738 B1 | 1/2005 | Bradley et al. |
| 7,043,501 B2 | 5/2006 | Schiller |
| 7,054,741 B2 | 5/2006 | Harrison et al. |
| 7,076,448 B1 | 7/2006 | Snyder |
| 7,289,965 B1 | 10/2007 | Bradley et al. |
| 7,333,943 B1 | 2/2008 | Charuk et al. |
| 2001/0029477 A1 | 10/2001 | Freeman et al. |
| 2001/0039506 A1 | 11/2001 | Robbins |
| 2001/0047327 A1* | 11/2001 | Courtney ............... 705/38 |
| 2002/0035535 A1 | 3/2002 | Brock, Sr. |
| 2002/0052766 A1 | 5/2002 | Dingman et al. |
| 2002/0099650 A1 | 7/2002 | Cole |
| 2002/0103669 A1 | 8/2002 | Sullivan, Sr. et al. |
| 2002/0133371 A1 | 9/2002 | Cole |
| 2002/0147613 A1 | 10/2002 | Kennard et al. |
| 2003/0011599 A1 | 1/2003 | Du |
| 2003/0036995 A1 | 2/2003 | Lazerson |
| 2003/0036996 A1 | 2/2003 | Lazerson |
| 2003/0046099 A1 | 3/2003 | Lamont et al. |
| 2003/0093366 A1 | 5/2003 | Halper et al. |
| 2003/0126071 A1 | 7/2003 | Keyes et al. |
| 2003/0144948 A1 | 7/2003 | Cleary et al. |
| 2003/0149658 A1 | 8/2003 | Rossbach |
| 2003/0149659 A1 | 8/2003 | Danaher et al. |
| 2003/0191723 A1 | 10/2003 | Foretich et al. |
| 2004/0019517 A1 | 1/2004 | Sennott |
| 2004/0021584 A1 | 2/2004 | Hartz, Jr. et al. |
| 2004/0039581 A1 | 2/2004 | Wheeler |
| 2004/0049440 A1 | 3/2004 | Shinoda et al. |
| 2004/0078464 A1 | 4/2004 | Rajan et al. |
| 2004/0128232 A1 | 7/2004 | Descloux |
| 2004/0133493 A1 | 7/2004 | Ford et al. |
| 2004/0153330 A1* | 8/2004 | Miller et al. ............ 705/1 |
| 2004/0243450 A1 | 12/2004 | Bernard |
| 2005/0108025 A1 | 5/2005 | Cagan |
| 2005/0171822 A1 | 8/2005 | Cagan |
| 2005/0192999 A1 | 9/2005 | Cook et al. |
| 2005/0216292 A1 | 9/2005 | Ashlock |
| 2005/0288942 A1 | 12/2005 | Graboske et al. |
| 2006/0015357 A1 | 1/2006 | Cagan |
| 2006/0026136 A1 | 2/2006 | Drucker et al. |
| 2006/0064415 A1 | 3/2006 | Guyon et al. |
| 2006/0085234 A1 | 4/2006 | Cagan |
| 2006/0105342 A1 | 5/2006 | Villena et al. |
| 2006/0122918 A1 | 6/2006 | Graboske et al. |
| 2006/0200492 A1 | 9/2006 | Villena et al. |
| 2006/0218003 A1 | 9/2006 | Snyder |
| 2006/0218005 A1 | 9/2006 | Villena et al. |
| 2007/0033122 A1 | 2/2007 | Cagan |
| 2007/0033126 A1 | 2/2007 | Cagan |
| 2008/0097767 A1 | 4/2008 | Milman et al. |

FOREIGN PATENT DOCUMENTS

| | | |
|---|---|---|
| JP | 2002123589 | 4/2002 |
| KR | 1020010078857 | 8/2001 |
| KR | 1020010105569 | 11/2001 |
| KR | 1020020004710 | 1/2002 |
| KR | 1020050064605 | 6/2005 |

OTHER PUBLICATIONS

Meyer, Philip. Precision Journalism. Rowman & Littlefield Publishers. 2002. pp. 39-41.*

"Median Price by Zip Code by Month for May 2004," DataQuick Information Systems, *Los Angeles Times*, 6 pages, Jun. 2004.

"GIS for Real Estate," www.esri.com, 1 page, Feb. 15, 2007.

"Using GIS for Real Estate Market Analysis: The Problem of Spatially Aggregated Data," John Clapp, Journal of Real Estate Research, 9 pages, 1998.

"What's Your Home Worth," www.homevaluecma.com, 2 pages, Feb. 15, 2007.

"MBA's First Fraud Awareness Seminar: Detecting Fraud in the Mortgage Process," *Mortgage Bankers Association of America*, 1 page, Aug. 15, 2000.

"Freddie Fights Fraud with Technology, Score Helps Identify Inflated Property Values," *Mortgage Bankers Association of America*, 1 page, Mar. 15, 2002.

"Fraud on the Rise Advantage Credit Finds 23% of Brokers Surveyed Received Fraudulent Loan Applications," *Inman News Features*, 1 page, Sep. 17, 2002.

"City in Flames Atlanta Fraud Network Responsible for More than $100 Million in Losses," Sam Garcia, MortgageDaily.com, 2 pages, Nov. 14, 2002.

"Fraud Flips National Phenomenon a Look at Mortgage Fraud Schemes," Christy Robinson, MortgageDaily.com, 2 pages, Dec. 9, 2002.

"Pre Funding and Your Business!" Lisa Binkley et al., *QA Rockin' the Bay*, 31 pages, Jan. 31, 2003.

"Accurate Home Valuations . . . in Seconds!" *Veros Corp.*, 1 page, date unknown.

"Automated Valuation Models (AVM)," *Informative Research Corp.*, 1 page, date unknown.

"FNIS Launches QuadMerge™ Value," TitleWeb.com, 2 pages, date unkown.

"Home Value Explorer®," *Freddie Mac Corp.*, 1 page, date unknown.

"Freddie Mac's Home Value Explorer, VeroVALUE," *Determination Processing Services, Inc.*, 3 pages, date unknown.

"Identifying & Managing Technology Risks, Automated Valuation Models," Lewis J. Allen, 36 pages, date unknown.

"LSI Indicator, an LSI Collateral Assessment Solutions," LendersService.com, 2 pages, date unknown.

"Mitigating Portfolio Risk During a Flat Market," Gregory F. Hansen, 2 pages, date unkown.

"QuadMerge™ & QuadMerge Value™ Quick Reference Guide," *FNIS Corp.*, 1 page, date unknown.

"VEROS™ Software," verso.com, 31 pages, date unknown.

"AVM Debate Tilts in Favor: The mortgage lending industry may finally be ready embrace technology to automated the valuation function (Technology Information)," Mary Dunn, *Mortgage Technology*, 5 pages, Jul. 2001.

"Collateral Score Pat 1-Scoring Applications in Residential Mortgage Lending: A Survey of Issues," Nima Nattagh, et al. FNC White Paper, 8 pages, Feb. 2002.

"Home Price Analyzer: Online Index-Based Residential Property Valuations," homepriceanalyzer.com, 2 pages, Oct. 2002.

"FNIS Launches New Tool, HQ Score," *Real Estate Weekly*, Hagedorn Publication, 1 page, Apr. 30, 2003.

"Quick Value AVM Services: Instant Online AVMs Make for Rapid Decision Making," www.1sourcedata.com, 1 page, 2003.

"FNIS Hansen QRS: Product Overview," www.FNIS.com, 1 page, 2003.

"Forecasting Valuation Risk for Real Estate and Other Industries," Eric P. Fox, *Veros Software*, 14 pages, Jun. 17, 2003.

"PASS Valuation Model," Basis 100 Corp., 1 page, Jul./Aug. 2003.

"Freddie Mac's Home Value Explorer®," Freddie Mac, 1 page, Nov. 2003.

"Freddie Mac's Home Value Explorer®, Product Enhancement Summary Forecast Standard Deviation (FSD)," Freddie Mac, 2 pages, Apr. 4, 2004.

Doug Gordon, "Accurate AVM Values Help Monitor Subprime Appraisal Risk", Presented at MBA Subprime, May 13, 2004.

Douglas Gordon and Bud Sottili, "Precision is Crucial for AVM Selection", Secondary Marketing Executive, Apr. 2002.

\* cited by examiner

| EXAMPLE PROPERTY | |
|---|---|
| SALE PRICE | $800,000 |
| TOTAL LOAN BALANCE | $790,000 |
| AVM VALUATION | $929,000 |
| MARGIN OF SAFETY | 10% |

FIG. 3A

| CALCULATED INDICATORS | |
|---|---|
| EXPOSURE VALUE = (LOAN AMOUNT)/(1 − MARGIN OF SAFETY) | $\frac{\$790,000}{(1-.10)} = \$877,778$ |
| PREDETERMINED SIGMA | 0.114 OR 11.4% |
| EXPOSURE VARIANCE (AVM VALUATION − EXPOSURE VALUE)/ EXPOSURE VALUE | $\frac{929,000 - 877,778}{877,778} = 0.0584$ OR 5.84% |
| EXPOSURE VARIANCE IN SIGMA UNITS (EXPOSURE VARIANCE)/(PREDETERMINED SIGMA) | $\frac{5.84\%}{11.4\%} = 0.5122$ |
| ROUNDED EXPOSURE VARIANCE IN SIGMA UNITS | 0.51 |

FIG. 3B

| "BAD PART" CALCULATION | |
|---|---|
| SAFE SCORE | 78 OR 0.78 |
| TOTAL LOAN AMOUNT | $790,000 |
| "BAD PART" (1−55) * TLA | (1−0.78) * 790,000 = 173,800 |
| "BAD PART" RATIO BAD PART/TLA | 173,800/790,000 = 0.22 |

FIG. 3C

PERCENTILE TABLE OF VARIANCE MEASURED IN SIGMA UNITS

| N | 440,754 | STD. DEVIATION | 0.9663 |
|---|---|---|---|
| MEAN | -0.1321 | MINIMUM | -5.6919 |
| MEDIAN | -0.1952 | MAXIMUM | 6.1875 |

| PERCENTILES | VARIANCE AS MEASURED IN SIGMA UNITS | PERCENTILES | VARIANCE AS MEASURED IN SIGMA UNITS | PERCENTILES | VARIANCE AS MEASURED IN SIGMA UNITS |
|---|---|---|---|---|---|
| 1 | -2.3344 | 34 | -0.5307 | 67 | 0.1884 |
| 2 | -2.0317 | 35 | -0.5091 | 68 | 0.2143 |
| 3 | -1.8472 | 36 | -0.4874 | 69 | 0.2405 |
| 4 | -1.7120 | 37 | -0.4658 | 70 | 0.2676 |
| 5 | -1.6070 | 38 | -0.4441 | 71 | 0.2947 |
| 6 | -1.5190 | 39 | -0.4231 | 72 | 0.3233 |
| 7 | -1.4428 | 40 | -0.4024 | 73 | 0.3526 |
| 8 | -1.3773 | 41 | -0.3815 | 74 | 0.3826 |
| 9 | -1.3175 | 42 | -0.3606 | 75 | 0.4130 |
| 10 | -1.2631 | 43 | -0.3401 | 76 | 0.4454 |
| 11 | -1.2132 | 44 | -0.3194 | 77 | 0.4788 |
| 12 | -1.1684 | 45 | -0.2989 | 78 | 0.5145 |
| 13 | -1.1254 | 46 | -0.2782 | 79 | 0.5507 |
| 14 | -1.0852 | 47 | -0.2574 | 80 | 0.5879 |
| 15 | -1.0487 | 48 | -0.2361 | 81 | 0.6265 |
| 16 | -1.0121 | 49 | -0.2155 | 82 | 0.6674 |
| 17 | -0.9788 | 50 | -0.1952 | 83 | 0.7103 |
| 18 | -0.9460 | 51 | -0.1743 | 84 | 0.7565 |
| 19 | -0.9144 | 52 | -0.1532 | 85 | 0.8046 |
| 20 | -0.8839 | 53 | -0.1322 | 86 | 0.8567 |
| 21 | -0.8544 | 54 | -0.1103 | 87 | 0.9127 |
| 22 | -0.8258 | 55 | -0.0886 | 88 | 0.9736 |
| 23 | -0.7983 | 56 | -0.0672 | 89 | 1.0369 |
| 24 | -0.7719 | 57 | -0.0467 | 90 | 1.1089 |
| 25 | -0.7456 | 58 | -0.0244 | 91 | 1.1865 |
| 26 | -0.7207 | 59 | 0.0000 | 92 | 1.2741 |
| 27 | -0.6957 | 60 | 0.0186 | 93 | 1.3705 |
| 28 | -0.6714 | 61 | 0.0441 | 94 | 1.4789 |
| 29 | -0.6470 | 62 | 0.0662 | 95 | 1.6054 |
| 30 | -0.6230 | 63 | 0.0894 | 96 | 1.7540 |
| 31 | -0.5993 | 64 | 0.1139 | 97 | 1.9273 |
| 32 | -0.5762 | 65 | 0.1375 | 98 | 2.1500 |
| 33 | -0.5540 | 66 | 0.1624 | 99 | 2.4832 |

FIG. 4

| EXAMPLE PROPERTY | |
|---|---|
| SALE PRICE | $319,000 |
| TOTAL LOAN BALANCE | $319,000 |
| AVM VALUATION | $333,000 |
| MARGIN OF SAFETY | 10% |

FIG. 8A

| CALCULATED INDICATORS | |
|---|---|
| EXPOSURE VALUE = (LOAN AMOUNT)/(1 − MARGIN OF SAFETY) | $\frac{\$319,000}{(1-.10)} = \$354,444$ |
| PREDETERMINED SIGMA | 0.114 OR 11.4% |
| EXPOSURE VARIANCE (AVM VALUATION − EXPOSURE VALUE)/ EXPOSURE VALUE | $\frac{333,000 - 354,444}{333,000} = -6.05\%$ |
| EXPOSURE VARIANCE IN SIGMA UNITS (EXPOSURE VARIANCE)/(PREDETERMINED SIGMA) | $\frac{-6.05\%}{11.4\%} = -0.5307$ |
| ROUNDED EXPOSURE VARIANCE IN SIGMA UNITS | −0.53 |

FIG. 8B

| "BAD PART" CALCULATION | |
|---|---|
| SAFE SCORE | 34 OR 0.34 |
| TOTAL LOAN AMOUNT | $319,000 |
| "BAD PART" (1−SS) * TLA | (1−0.34) * 319,000 = 210,540 |
| "BAD PART" RATIO BAD PART/TLA | 210,540/319,000 = 0.66 |

FIG. 8C

SAFE SCORE DATA TABLE FOR ORANGE COUNTY, CALIFORNIA
DIVIDED BY PURCHASE QUARTER

| STATE | COUNTY | PURCHASE QUARTER | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|---|---|
| CA | ORANGE | 1 | 86.32 | 96.33 | $ 4,912,201,020 | $ 692,020,681 | 0.14 | 10,582 |
| CA | ORANGE | 2 | 71.32 | 86.00 | $ 5,284,504,164 | $ 1,543,488,738 | 0.29 | 10,846 |
| CA | ORANGE | 3 | 64.43 | 75.00 | $ 4,395,199,942 | $ 1,572,876,547 | 0.36 | 9,044 |
| CA | ORANGE | 4 | 63.24 | 71.33 | $ 1,975,260,319 | $ 739,136,150 | 0.37 | 4,157 |

FIG. 12

MULTIPLE PROPERTY "BAD PART" CALCULATIONS

| PROPERTY | SALE PRICE | FIRST MORTGAGE AMOUNT | SECOND MORTGAGE AMOUNT | TOTAL LOAN AMOUNT | AUTOMATED VALUATION | MARGIN OF SAFETY | SIGMA | EXPOSURE VALUE | EXPOSURE VARIANCE | EXPOSURE VARIANCE IN SIGMA UNITS | ROUNDED EXPOSURE VARIANCE IN SIGMA UNITS | SAFE SCORE | SAFE SCORE ROUNDED | BAD PART OF DECIMAL | BAD PART OF LOAN |
|---|---|---|---|---|---|---|---|---|---|---|---|---|---|---|---|
| 1 | $ 386,500 | $ 309,200 | $ 77,300 | $ 386,500 | $ 375,000 | 10% | 11.4% | 429,444 | -12.68% | -1.1121 | -1.11 | 13.5000 | 14 | 0.865000 | $ 334,323 |
| 2 | $ 492,000 | $ 393,600 | $ 73,800 | $ 467,400 | $ 532,000 | 10% | 11.4% | 519,333 | 2.44% | 0.2139 | 0.21 | 68.0000 | 63 | 0.320000 | $ 149,568 |
| 3 | $ 550,000 | $ 517,500 | $ 28,750 | $ 546,250 | $ 555,000 | 10% | 11.4% | 606,944 | -8.56% | -0.7507 | -0.75 | 25.0000 | 23 | 0.750000 | $ 409,688 |
| 4 | $ 649,000 | $ 519,200 |  | $ 519,200 | $ 734,000 | 10% | 11.4% | 576,889 | 27.23% | 2.3890 | 2.39 | 98.7273 | 99 | 0.012727 | $ 6,608 |
| 5 | $ 749,000 | $ 599,200 | $ 74,900 | $ 674,100 | $ 778,000 | 10% | 11.4% | 749,000 | 3.87% | 0.3396 | 0.34 | 72.6667 | 73 | 0.273333 | $ 184,254 |

| TOTAL LOAN AMOUNT | $ 2,593,450 |
|---|---|

| TOTAL BAD PART | $ 1,084,440 |
|---|---|
| BAD PART RATIO | 0.418 |

FIG. 13

SAFE SCORE DATA TABLE FOR DENVER COUNTY, COLORADO DIVIDED BY PURCHASE QUARTER

| STATE | COUNTY | PURCHASE QUARTER | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|---|---|
| CO | DENVER | 1 | 62.76 | 67.25 | $ 586,817,227 | $ 251,326,736 | 0.43 | 2,368 |
| CO | DENVER | 2 | 62.29 | 65.50 | $ 828,072,112 | $ 322,868,670 | 0.39 | 3,612 |
| CO | DENVER | 3 | 60.88 | 61.67 | $ 744,631,097 | $ 313,491,601 | 0.42 | 3,233 |
| CO | DENVER | 4 | 61.08 | 62.75 | $ 353,644,058 | $ 158,511,934 | 0.45 | 1,516 |

FIG. 14

SAFE SCORE DATA TABLE FOR LOS ANGELES COUNTY CALIFORNIA DIVIDED BY QUARTILE OF SALES PRICE

| STATE | COUNTY | QUARTILE | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|---|---|
| CA | LOS ANGELES | 1 | 65.78 | 73.00 | $ 4,882,142,117 | $ 1,945,434,334 | 0.40 | 21,386 |
| CA | LOS ANGELES | 2 | 62.37 | 65.50 | $ 7,140,758,634 | $ 2,913,025,068 | 0.41 | 22,297 |
| CA | LOS ANGELES | 3 | 69.58 | 79.00 | $ 8,653,649,586 | $ 2,925,721,380 | 0.34 | 21,886 |
| CA | LOS ANGELES | 4 | 79.17 | 91.25 | $ 14,136,065,847 | $ 3,313,966,115 | 0.23 | 21,524 |

FIG. 15

NATIONAL SAFE SCORE DATA TABLE DIVIDED BY DECILE OF SALES PRICE

| DECILE | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|
| 1 | 75.59 | 87.00 | $ 18,512,266,883 | $ 5,654,120,397 | 0.31 | 142,394 |
| 2 | 65.73 | 71.00 | $ 26,967,888,137 | $ 10,207,189,626 | 0.38 | 165,244 |
| 3 | 64.29 | 68.33 | $ 31,035,782,340 | $ 11,997,096,867 | 0.39 | 169,900 |
| 4 | 64.75 | 69.33 | $ 34,322,783,710 | $ 13,004,705,611 | 0.38 | 171,906 |
| 5 | 66.13 | 72.33 | $ 37,257,508,103 | $ 13,522,060,395 | 0.36 | 172,016 |
| 6 | 68.23 | 76.33 | $ 40,455,617,773 | $ 13,833,247,972 | 0.34 | 171,631 |
| 7 | 70.51 | 80.25 | $ 44,038,417,415 | $ 13,894,123,446 | 0.32 | 170,434 |
| 8 | 72.73 | 83.60 | $ 49,334,786,971 | $ 14,440,817,752 | 0.29 | 169,745 |
| 9 | 75.18 | 87.00 | $ 58,449,213,650 | $ 15,959,659,725 | 0.27 | 168,259 |
| 10 | 76.35 | 90.13 | $ 88,592,170,768 | $ 24,359,144,225 | 0.28 | 161,022 |

FIG. 16

SAFE SCORE DATA TABLE DIVIDED BY STATE

| STATE | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|
| AL | 62.56 | 63.50 | $ 1,111,142,487 | $ 426,060,970 | 0.38 | 7,426 |
| AR | 56.91 | 53.00 | $ 620,029,841 | $ 277,260,034 | 0.45 | 4,502 |
| AZ | 67.52 | 75.75 | $ 18,686,622,397 | $ 6,524,162,582 | 0.35 | 101,474 |
| CA | 71.27 | 82.50 | $ 167,462,247,889 | $ 50,701,758,687 | 0.30 | 438,792 |
| CO | 57.62 | 57.67 | $ 15,063,773,762 | $ 6,626,873,291 | 0.44 | 65,426 |
| CT | 80.62 | 88.57 | $ 8,063,881,310 | $ 1,475,831,096 | 0.18 | 31,239 |
| DC | 70.66 | 76.00 | $ 1,325,175,204 | $ 397,289,243 | 0.30 | 3,816 |
| DE | 64.43 | 66.00 | $ 837,547,989 | $ 320,253,600 | 0.38 | 4,817 |
| FL | 72.23 | 82.25 | $ 59,706,857,828 | $ 19,029,831,390 | 0.32 | 304,980 |
| GA | 58.88 | 57.67 | $ 2,306,790,311 | $ 1,006,246,771 | 0.44 | 11,795 |
| HI | 74.17 | 82.25 | $ 1,987,188,329 | $ 558,267,446 | 0.28 | 4,704 |
| IL | 67.59 | 73.33 | $ 20,803,878,121 | $ 7,268,678,917 | 0.35 | 93,451 |
| MA | 84.16 | 91.13 | $ 16,977,746,432 | $ 2,823,483,784 | 0.17 | 62,250 |
| MD | 69.38 | 77.00 | $ 7,169,893,777 | $ 2,222,135,020 | 0.31 | 27,788 |
| MI | 65.62 | 70.50 | $ 2,040,237,595 | $ 761,003,552 | 0.37 | 11,188 |
| MO | 70.09 | 78.00 | $ 3,594,996,222 | $ 1,322,779,590 | 0.37 | 24,306 |
| NC | 63.76 | 65.50 | $ 7,090,069,640 | $ 3,019,904,936 | 0.43 | 37,011 |
| NJ | 77.24 | 86.40 | $ 8,843,019,529 | $ 2,273,027,795 | 0.26 | 31,654 |
| NV | 70.96 | 83.60 | $ 15,897,597,431 | $ 5,385,613,360 | 0.34 | 65,525 |
| NY | 76.16 | 83.00 | $ 6,777,844,828 | $ 1,905,691,115 | 0.28 | 25,668 |
| OH | 61.92 | 64.00 | $ 7,538,435,010 | $ 3,037,987,908 | 0.40 | 56,354 |
| OK | 57.50 | 55.00 | $ 1,745,528,551 | $ 815,301,834 | 0.47 | 14,140 |
| OR | 66.95 | 72.00 | $ 7,936,942,206 | $ 2,857,059,176 | 0.36 | 41,090 |
| PA | 73.49 | 81.00 | $ 3,724,286,296 | $ 1,067,033,980 | 0.29 | 19,405 |
| SC | 69.91 | 77.67 | $ 605,545,596 | $ 198,338,201 | 0.33 | 2,508 |
| TN | 57.93 | 55.00 | $ 4,493,411,882 | $ 2,056,361,995 | 0.46 | 27,094 |
| VA | 72.23 | 83.20 | $ 15,420,776,709 | $ 4,351,459,999 | 0.28 | 51,370 |
| WA | 65.08 | 69.00 | $ 20,248,426,866 | $ 7,782,291,198 | 0.38 | 85,554 |
| WI | 61.21 | 62.50 | $ 878,882,016 | $ 380,101,946 | 0.43 | 7,012 |

FIG. 17

SAFE SCORE DATA TABLE FOR TWO STATES
DIVIDED BY PURCHASE QUARTER

| STATE | QUARTER OF PURCHASE | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|---|
| CA | 1 | 85.28 | 93.18 | $ 40,557,764,377 | $ 6,518,431,719 | 0.16 | 114,353 |
| CA | 2 | 73.03 | 82.75 | $ 53,116,006,827 | $ 15,149,538,457 | 0.29 | 137,726 |
| CA | 3 | 62.86 | 68.00 | $ 48,719,786,460 | $ 18,415,436,430 | 0.38 | 125,191 |
| CA | 4 | 58.40 | 60.00 | $ 25,068,690,225 | $ 10,618,352,082 | 0.42 | 61,522 |
| CO | 1 | 59.01 | 61.00 | $ 3,448,672,449 | $ 1,495,164,231 | 0.43 | 14,738 |
| CO | 2 | 57.86 | 58.00 | $ 5,061,413,485 | $ 2,161,278,974 | 0.43 | 21,905 |
| CO | 3 | 57.04 | 56.50 | $ 4,353,291,303 | $ 1,942,918,087 | 0.45 | 19,193 |
| CO | 4 | 56.08 | 54.50 | $ 2,200,396,252 | $ 1,027,511,999 | 0.47 | 9,590 |

FIG. 18

SAFE SCORE DATA TABLE DIVIDED
BY STATE FOR ONE QUARTER

| STATE | QUARTER OF PURCHASE | MEAN SAFE SCORE | MEDIAN SAFE SCORE | TOTAL LOANS AT PURCHASE | TOTAL "BAD PART" | "BAD PART" RATIO | N OF CASES |
|---|---|---|---|---|---|---|---|
| AL | 4 | 60.57 | 61.67 | $ 104,779,591 | $ 44,060,810 | 0.42 | 717 |
| AR | 4 | 53.72 | 50.00 | $ 66,827,104 | $ 31,141,471 | 0.47 | 491 |
| AZ | 4 | 55.01 | 53.50 | $ 3,172,450,364 | $ 1,549,864,178 | 0.49 | 16,417 |
| CA | 4 | 58.40 | 60.00 | $ 25,068,690,225 | $ 10,618,352,082 | 0.42 | 61,522 |
| CO | 4 | 56.08 | 54.50 | $ 2,200,396,525 | $ 1,027,511,999 | 0.47 | 9,590 |
| CT | 4 | 76.50 | 85.00 | $ 1,242,080,669 | $ 274,565,595 | 0.22 | 4,891 |
| DC | 4 | 68.63 | 76.33 | $ 60,042,989 | $ 18,543,400 | 0.31 | 143 |
| FL | 4 | 60.63 | 65.50 | $ 8,202,661,218 | $ 3,577,896,744 | 0.44 | 39,127 |
| GA | 4 | 57.02 | 55.00 | $ 230,432,177 | $ 107,175,943 | 0.47 | 1,205 |
| HI | 4 | 64.82 | 68.00 | $ 427,711,821 | $ 159,527,716 | 0.37 | 946 |
| IL | 4 | 62.23 | 65.00 | $ 2,171,291,658 | $ 883,881,275 | 0.41 | 9,628 |
| MA | 4 | 81.87 | 88.86 | $ 2,868,143,362 | $ 558,891,568 | 0.19 | 10,504 |
| MD | 4 | 94.74 | 99.00 | $ 25,060,112 | $ 3,831,406 | 0.15 | 482 |
| MI | 4 | 64.64 | 68.67 | $ 126,312,501 | $ 48,126,197 | 0.38 | 740 |
| MO | 4 | 74.51 | 82.38 | $ 401,106,404 | $ 200,547,623 | 0.50 | 2,482 |
| NC | 4 | 62.93 | 64.00 | $ 1,101,799,064 | $ 473,565,823 | 0.43 | 6,077 |
| NJ | 4 | 70.82 | 79.75 | $ 1,074,896,350 | $ 364,125,343 | 0.34 | 3,694 |
| NV | 4 | 50.05 | 45.00 | $ 1,923,979,883 | $ 1,043,087,479 | 0.54 | 7,341 |
| NY | 4 | 70.71 | 76.83 | $ 484,779,280 | $ 158,962,810 | 0.33 | 1,414 |
| OH | 4 | 60.12 | 60.50 | $ 1,107,978,687 | $ 470,506,654 | 0.42 | 8,378 |
| OK | 4 | 56.04 | 52.00 | $ 241,926,081 | $ 120,642,994 | 0.50 | 1,980 |
| OR | 4 | 61.64 | 64.00 | $ 1,529,681,153 | $ 636,434,760 | 0.42 | 7,677 |
| PA | 4 | 65.63 | 71.17 | $ 266,239,411 | $ 101,816,338 | 0.38 | 1,642 |
| SC | 4 | 63.89 | 71.67 | $ 44,537,264 | $ 18,689,738 | 0.42 | 169 |
| TN | 4 | 55.74 | 51.00 | $ 664,107,588 | $ 324,766,660 | 0.49 | 4,213 |
| VA | 4 | 59.23 | 63.25 | $ 2,328,753,608 | $ 967,321,279 | 0.42 | 7,514 |
| WA | 4 | 58.68 | 59.00 | $ 3,391,864,538 | $ 1,519,073,859 | 0.45 | 14,320 |
| WI | 4 | 56.67 | 55.50 | $ 93,244,058 | $ 45,647,457 | 0.49 | 733 |

FIG. 19

METHOD AND APPARATUS FOR ADVANCED MORTGAGE DIAGNOSTIC ANALYTICS

FIELD OF THE INVENTION

The present invention relates to real estate valuation and mortgage offerings and more specifically to a method and apparatus for evaluating the risk of exposure due to default in holding loans associated with a particular property or set of properties and the potential likelihood of possible refinancing or additional borrowing on the part of the owner.

BACKGROUND OF THE INVENTION

Lenders on real property often hold a large number of mortgages at one time. These mortgages, individually and collectively, have various characteristics that demonstrate more or less probability that the borrower may default, or that there will be a loss to the lender in the event of borrower default or, on the other hand, that they will be repaid before the stated term of the loan is complete. These mortgages also have various characteristics that demonstrate more or less probability that the borrower will seek refinancing or apply for additional credit. Each loan may be evaluated individually by a particular lender in efforts to determine the likelihood of repayment on those loans, or the likelihood of default, or of loss in the event of a default. This consideration may include the credit rating of the borrower(s), the payment history, the current market trends, and many other variables. This process, for the lender, can be very time-consuming and costly. Additionally, it is made more difficult because of the large number of loans held by most mortgage lenders.

Because of the need for quick, accurate and inexpensive evaluation of the risk of loss in the event of a default due to exposure of individual or multiple mortgages held by a lender, and to provide some measure of the propensity of a borrower to seek refinancing or additional mortgage credit, this invention has been created. This invention enables a lender to quickly estimate the potential loss exposure of an individual property or group of properties, and estimate the propensity of a borrower to seek refinancing or additional mortgage credit. This invention improves upon the prior art in that it does not require obtaining a purchase offer, a sale price or an appraisal of the property. Any of these options are not practical given a large group of properties for which mortgages are held by a lender. Appraisals are expensive, and sale prices can only be known when the property is actually sold. The method of this invention provides an inexpensive, quick, highly accurate and sensitive means to judge the risk due to exposure in the case of a default for a property or group of properties, or the worthiness and openness of a property and its owner to refinance or qualify for additional borrowing.

This invention improves on the prior art in its accuracy, simplicity, cost, its sophistication and its sensitivity. It also enables the mortgage lender to specify what level of safety is desired, either based upon some measure or at a set percentage. Nothing in the prior art performs the same functions and processes described herein. Most notably, no prior art combines the useful diagnostic tool, combined with additional methods here, previously disclosed in the now-pending patent application, owned by the same assignee as this application entitled Method and Apparatus for Constructing a Forecast Standard Deviation for Automated Valuation Modeling application Ser. No. 10/944,593 filed on Sep. 17, 2004 respectively into a cohesive and valuable whole. Also, the data stratum created using the now-pending patent application entitled Method and Apparatus for Spatiotemporal Valuation of Real Estate application Ser. No. 10/892,618 filed on Jul. 16, 2004 may be used in the preferred embodiment.

BRIEF SUMMARY OF THE INVENTION

According to the present invention, a method and apparatus are described whereby one or more properties are tested for their risk of exposure, where risk of exposure is an indication of the likelihood of lender loss in the event of a default using several data sets easily obtained from the above-mentioned prior disclosures. This risk does not represent any actual probability, but is a measure somewhat related or synonymous to a probability. This invention combines (1) the current loan balance owed on a property or group of properties, (2) a "margin of safety" desired by the lender, (3) an automated valuation model (AVM) valuation of the subject property and (4) a forecast standard deviation for that automated valuation of that property as described in the now-pending patent application entitled Method and Apparatus for Constructing a Forecast Standard Deviation for Automated Valuation Modeling with application Ser. No. 10/944,593 filed on Sep. 17, 2004, published as U.S. Pat. Pub. No. 2006/0085234, and owned by the assignee of this application, which is hereby incorporated by reference in its entirety. In the preferred embodiment, the method and apparatus of this invention combines these four data sets into a measure of the risk of loss in the event of a default for a particular loan or group of loans. The lender's desired margin of safety with respect to each individual loan or a group of loans is taken into consideration in creating this measure. The resulting diagnostics can also be useful to a lender or other user for purposes of evaluating whether a borrower may refinance or seek additional credit with the existing lender or other lenders. Companies involved in the "bundling" of mortgages for securitization of mortgages may also see substantial benefit to such an invention.

In the preferred embodiment, the diagnostics created using this method and apparatus are updated quarterly or monthly. In alternative embodiments the diagnostics may be updated after any passage of time, even on a particular day requested. These diagnostics take into account not only the four elements used in the preferred embodiment, but also estimates of the automated valuation model valuation's accuracy, and the lender's aggressiveness in setting a margin of safety. For instance, the margin of safety need not be set at a constant number or percentage. It may be made to vary according to the borrower's payment record, credit score, and numerous other factors.

The invention may be used to create measures for individual properties, and then aggregate these probabilities into another measure applied to a group or portfolio of properties. Using the law of averages, these probabilities are used to generate a "good" loan dollar value or fraction of the total loan balance, and a "bad" loan dollar value or fraction of the total loan balance for entire groups of mortgaged properties. For example, suppose that for a particular property, the risk exposure or "bad part" is 0.15 (or 0.20, etc.) which symbolizes that there is a 15% "bad" in the loan amount (or 20%, etc.). When that property loan is combined with thousands of other property loans, the "bad part" of each loan may be added up and this sum divided by the total amount of all the loans together. Suppose that this division results in a quotient of 0.17 or 17%. Then, according to the law of averages, 17% of the value of that group of loans is "bad" whereas 83% of the value of those loans is "good." Neither of these indicators are probabilities, but instead are indications of potential loss, based upon automated valuations and estimates of the accuracy of those valuations and a desired "cushion." So, individually, this doesn't mean that any particular loan will only pay back 83% of its value, nor does this mean this when the "good" parts are aggregated. However, the number created, such as 83% or simply 83 may be used to compare properties or groups of properties and may be tracked for improvement or degradation. Inversely, if there is a score of 45, then this means that 45% of the total loan value is "good" and 55% of the loan value is bad. This is a particularly low score, but is dependent and sensitive to changes in the margin of safety, loan pay-down, automated valuation model (AVM) valuation accuracy, and lender generosity.

This score information is very useful to lenders who wish to understand their current lending position in order to better plan or allocate resources accordingly. For example, if the market is in a downturn, using the method of this invention, the scores will decrease over time, all other things being equal. The lender, in that case, may wish to increase the margin of safety they desire in order to more adequately protect themselves from loss in the event of default. Alternatively, in a rising market or with a particularly "good paying" loan customer, the lender may desire to lower the margin of safety because the market or the individual themselves are relatively safe. This will result in a higher overall score for that property or properties. Further features and advantages of the present invention will be appreciated by reviewing the following drawings and detailed description of the invention.

BRIEF DESCRIPTION OF THE DRAWINGS

FIG. 3*a* is a table depicting relevant variable values for an example case.

FIG. 3*b* is a table depicting calculated indicator values for an example case.

FIG. 3*c* is a table depicting the calculation of a "bad part" and "bad part" ratio.

FIG. 4 is a table of sample area sigma units percentiles.

FIG. 8*a* is a table depicting relevant variable values of an additional example case.

FIG. 8*b* is a table depicting calculated indicator values of the additional example case.

FIG. 8*c* is a table depicting the calculation of a "bad part" and "bad part" ratio.

FIG. 12 is a table depicting safe score data for a county divided by purchase quarter.

FIG. 13 is a table depicting the calculation of the "bad part" and "bad part" ratio for a group of properties.

FIG. 14 is a table depicting safe score data for a different county divided by purchase quarter.

FIG. 15 is a table depicting safe score data for a particular county divided according to quartile of price of the property.

FIG. 16 is a table depicting safe score data for the United States divided into deciles by price of the property.

FIG. 17 is a table depicting safe score data for the United States divided by state.

FIG. 18 is a table depicting safe score data for a state further divided by purchase quarter.

FIG. 19 is a table depicting safe score data for each state with reference only to the fourth quarter of 2004.

DETAILED DESCRIPTION OF THE INVENTION

Figure 1:
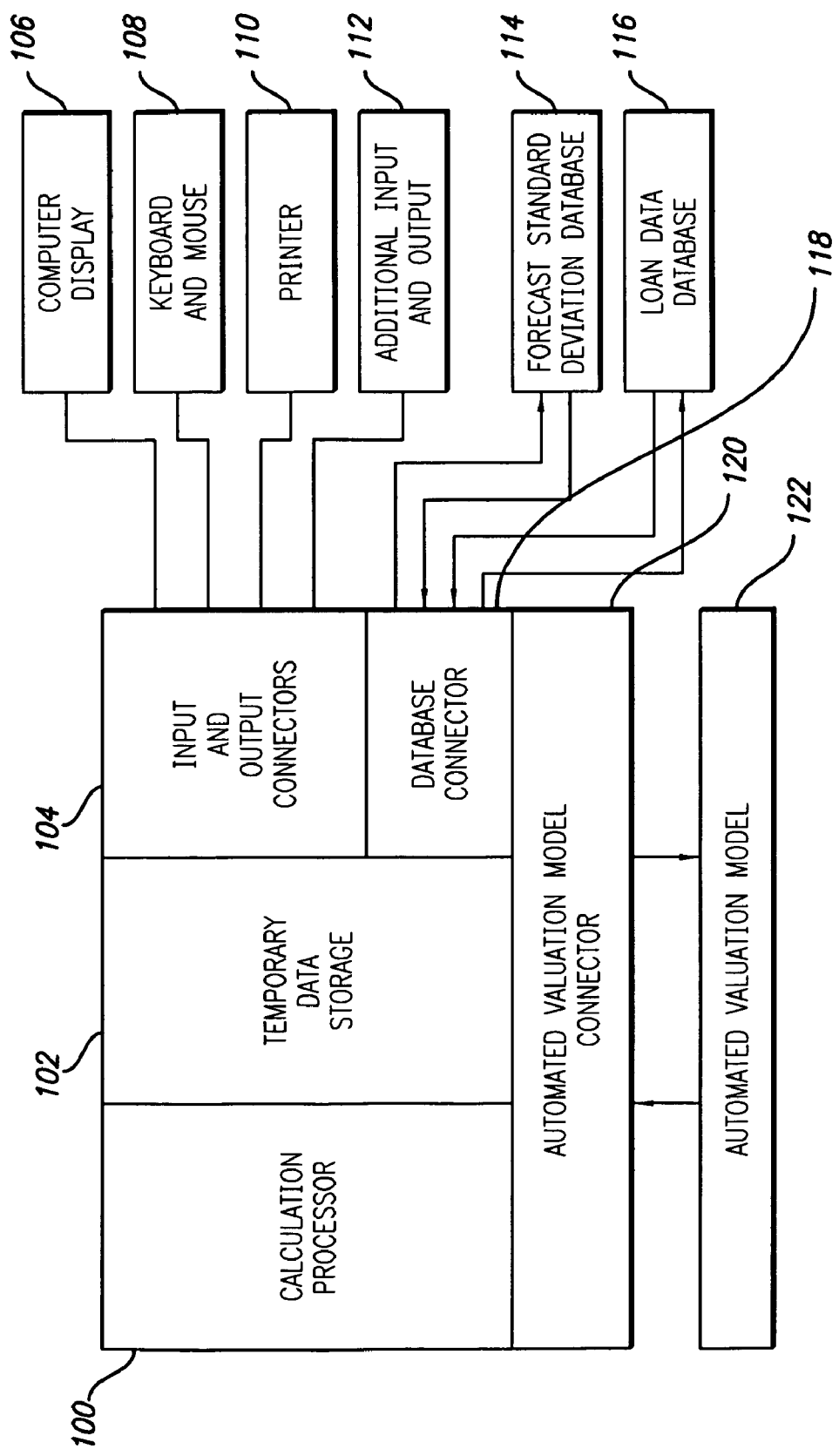
FIG. 1 is an overview of the data structure used in the method of this invention.

Referring first to FIG. 1, an example data structure which may be used to practice the invention is depicted. In this data structure, various elements are depicted. These elements may be hardware or software-based. More elements may be added or elements may be removed in a manner well-known in the art without altering the overall scope of the present invention. In the preferred embodiment, each of these elements are implemented using at least one operating system software on at least one computer. Most often, the elements connected with arrows will be running on additional computers. In this data structure, the calculation processor 100 is used to perform all calculations with respect to percentages and other mathematical operations performed in generating these diagnostics. The temporary data storage 102 is used to store temporary data while performing calculations and automating the process of running diagnostics. If the method of this invention is implemented in hardware, this would likely be system memory. If the method of this invention is implemented as software running on an operating system, this will be allocated system memory maintained and controlled by the operating system.

The input and output connectors 104 are used to communicate with external input and output devices such as a monitor 106, keyboard and mouse 108, printer 110 or any additional input and output 112. The database connector 118 is used to connect the diagnostic data structure to a loan data database 116. The automated valuation model connector 120 is used to connect the diagnostic data structure to at least one automated valuation model 122. In the preferred embodiment, this connection is made using data transmitted over a network using extended markup language (XML), a manner well-known in the art. However, alternative embodiments may use alternative means of requesting and sending this data, for example, direct database lookup.

Figure 2:
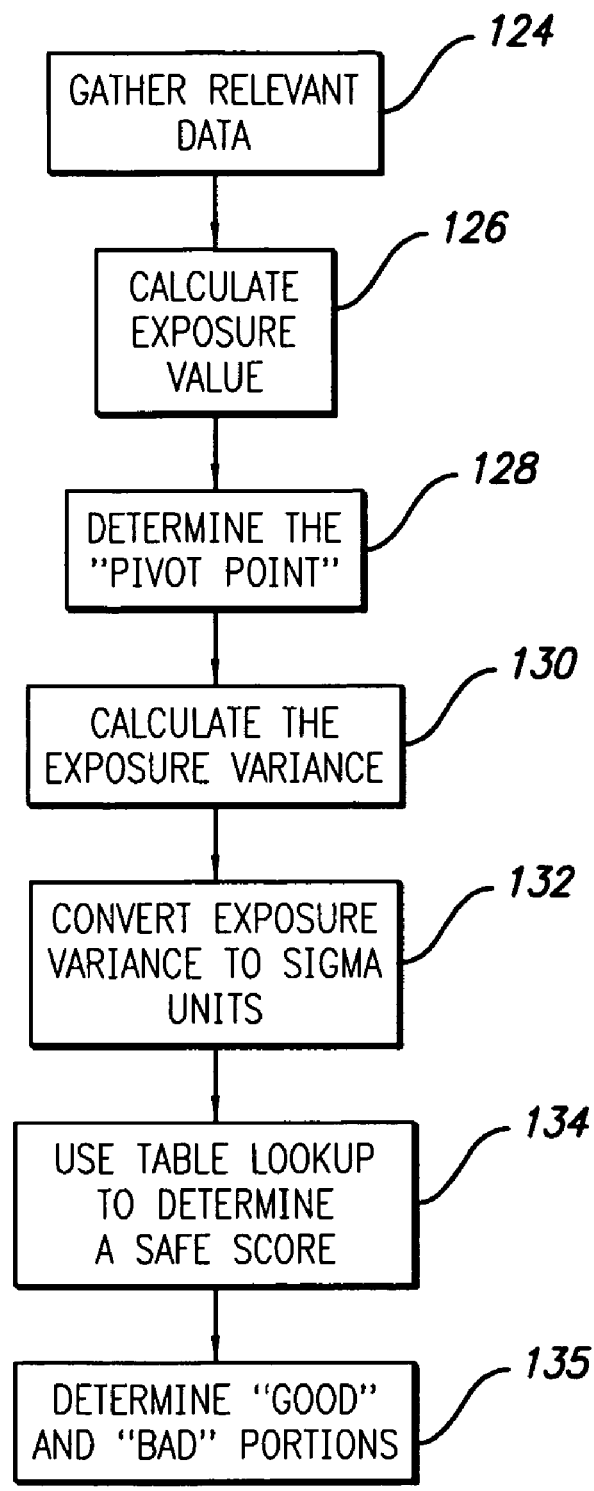
FIG. 2 is a flowchart of the steps involved in performing one iteration of a diagnostic.

Referring now to FIG. 2, a flowchart depicting the steps involved in creating a loan diagnostic for a single property is depicted. The first step in the preferred embodiment of this method is to gather the relevant data 124. This includes gathering a total loan balance—the total balances of all loans on the property—and an automated valuation of the subject property. In the preferred embodiment, the loan balance is the total loan balance of all loans on the property. This also includes gathering a forecast standard deviation for the automated valuation. The forecast standard deviation provides a measure of the potential standard deviation of the valuation error made by an automated valuation. This is described in the co-pending patent application entitled Method and Apparatus for Constructing a Forecast Standard Deviation for Automated Valuation Modeling with application Ser. No. 10/944,593 filed on Sep. 17, 2004 and owned by the assignee of this application. The forecast standard deviation may be calculated each time this request is made for a subject property. Also, the automated valuation may be computed when each request is made. However, this is not optimal. Generally, in the preferred embodiment, the method of this application will utilize existing databases such as the spatiotemporal database described in the now-pending patent application owned by the same assignee of this patent application entitled Method and Apparatus for Spatiotemporal Valuation of Real Estate application Ser. No. 10/892,613 filed Jul. 16, 2004, using the database connector 118 and the Automated Valuation Model Connector 120 (See FIG. 1), of automated valuations and forecast standard deviations for a subject property, eliminating the need for additional calculations and computations prior to providing a diagnostic for each subject property. The data set useful herein may be calculated using the method described in the co-pending patent application Ser. No. 10/892,618 filed on Jul. 16, 2004 and owned by the assignee of this patent application.

The next step is to calculate an exposure value 126. In this step, the margin of safety (a percentage) is used to calculate an exposure value. An exposure value is a dollar value or percentage which is a certain amount, over and above the loan amount, that the lender wishes the property were valued at in order to assure themselves that they will not lose money on the property should it go into default. This additional value or percentage is the "margin of safety." It may be set at a constant such as 10% or be made to vary according to borrower loan performance, borrower credit score, anticipated market price and economic trends, or other factors. It is essentially a premium on the loan amount to take care of the incidental costs associated with foreclosure on a property. Next, this exposure value is then determined to be the "pivot point" 128 for this property. The pivot point is the dollar amount at which valuations over this amount will be "good" for the lender and valuations below this pivot point will be "bad" for the lender. The "good" situation means that the lender is protected, having more than the loan amount plus a margin of safety, where the "bad" situation means that the property may be worth less than the loan amount plus the margin of safety. The next step is to calculate the exposure variance 130. This exposure variance is the difference between the exposure value and the automated valuation, divided by the exposure value. This results in a percentage value difference, either positive or negative.

The exposure variance is then divided by the forecast standard deviation, either previously generated or generated for this application in real-time, for the particular valuation to convert the exposure variance into an exposure variance in sigma units 132. Finally, a percentile table of variance measured in sigma units is consulted to find the percentile associated with the exposure variance in sigma units, which then yields the safe score 134. The percentile is then the "good" portion of the loan and the "bad" portion of the loan is 100− (minus) the safe score. This is the final step, where the good and bad portions are determined 135. This will result in a safe score equal to the "good" percentage. This safe score is useful in comparing loans or groups of loans with other loans or groups of loans for risk.

This process can best be explained by way of an example. Referring to FIG. 3a, example property data is depicted. In a particular zip code, a home was purchased for a sale price of $800,000, as depicted in element 136, five months prior. The total left on the loan amount is $790,000, as depicted in element 138. The Automated Valuation Model Valuation currently values the property at $929,000 as depicted in element 140. The lender has requested a "margin of safety" of 10%, as depicted in element 142. This margin of safety is the amount, over-and-above the loan balance, that the lender would like the property value to be, in order to be "safe." This margin of safety is often sought by lenders in a real estate market to deal with the typical costs of foreclosure and resale of the property, the usual "foreclosure discount" that properties that have been foreclosed upon must be sold at and any other costs related to a potential default on a property.

The margin of safety may be arbitrarily set, as is so in this example, at 10%. Other reasonable percentages range from 0% to 25%; though percentages larger than 25% are possible, they are not likely to be chosen by lenders. In the preferred method of this invention, the value is set by the lender, dependant upon their preferences. In another embodiment, the margin of safety on an individual property may be set by some calculation relating to the number of defaults in a particular geographic area, the credit-worthiness of the property buyer, the property-buyer's current and past payment history on the loan or any number of other personalized factors that may demonstrate a likelihood of default. Higher margins of safety may be chosen by this calculation when the individual has demonstrated some inability to make payments or when the property or neighborhood has had its value significantly negatively affected. Lower margins of safety may be used, for example, when the borrower has an excellent payment history or values in the area are expected to rapidly appreciate.

Referring again to FIGS. 2 and 3b, the first portion of the next step, calculating the indicators 126 from FIG. 2 is depicted. In the first part of this step, the outstanding loan balance of $790,000 (in element 138) and the margin of safety of 10% (in element 142) are used to create an exposure value of $877,778, as depicted in element 144. This calculation is done by dividing the outstanding loan balance by one minus the margin of safety, $790,000/(1−0.10)=$877,778 as depicted in element 144. This exposure value is a representation of the minimum value of the property that a lender would desire. This type of minimum value demonstrates a unique characteristic, monotonicity. This characteristic means that any home value of $877,778 or above will be a good or positive situation for the lender. Alternatively, any home value below $877,778 will be a bad or negative situation. This latter situation will represent a home value that may make the lender unable to receive full reimbursement for loans extended upon sale of the property. The former situation, that is, home values of $877,778 and above, represents values for which the lender is expected to be able to receive full reimbursement for the loan extended should the property be sold in a foreclosure. This value is determined to be the "pivot point" 128 for this property and loan.

The next step is to use the Sigma (the Forecast Standard Deviation) that has already been calculated in the preferred embodiment. Each Sigma is associated with an automated valuation according to the area and property characteristics of the subject property. In the preferred embodiment, it is already assigned to the subject property's valuation. Alternatively, it may be calculated, each time this diagnostic is computed for a specific property. However, in alternative embodiments, Sigma may be defined using valuations in any predetermined region. Other reasonable geographic areas include national, state, county, or city.

Multi-county and other non-contiguous groups with alternative definitions may be used as well, such as all homes valued at more than $600,000 nationally or all homes within three zip codes throughout the United States, or all homes in the top or bottom quartile of valuation in the United States, or in a certain county. A measure of automated valuation accuracy such as a confidence score, methods by which these may be calculated are well-defined in the art, may be used in assigning a Sigma or forecast standard deviation. Any group of properties for which data may be obtained may be used.

Subdivisions thereof may be made on almost any basis, though geographic area is used in the preferred embodiment.

In this example, the predetermined Sigma for the area, in this case calculated as a single percentage for the entirety of Orange County, Calif., is 11.4% as depicted in element 146. However, in the preferred embodiment, the method for determining Sigmas, as described in the co-pending patent application Ser. No. 10/892,618 filed on Jul. 16, 2004 and owned by the assignee of this patent application, is done by using multiple sub-division of property categories. Using this method, Sigmas may be calculated on a virtually property-by-property basis. Therefore, each Sigma used, in the preferred embodiment, will be generated or determined for the subject property or properties.

Next, the exposure variance is calculated for the subject property 130. The exposure variance is equal to the automated valuation model valuation minus the exposure value, all divided by the exposure value. This is a measure of how greatly the automated valuation model valuation is different from the exposure value. It creates a percentage difference between the two with reference to the difference as a percentage of the exposure value. In the example, the exposure variance is ($929,000–$877,778)/$877,778 or 5.84% as depicted in element 148. So, there is value in the property 5.84% over the margin of safety, assuming that the automated valuation model valuation is absolutely correct. However, automated valuation models vary in accuracy, typically from 6% to 15% above or below the "true value" of a property. In order to give some measure of this accuracy, the forecast standard deviation, as described in the cited prior application, was developed.

The next step in is to calculate the exposure variance in sigma units 132. Sigma units are described in the co-pending patent application with application Ser. No. 10/944,593 filed on Sep. 17, 2004 and owned by the assignee of this patent application. To do this, the exposure variance is divided by the predetermined sigma for the property or group of properties. In the example, this predetermined sigma for the property has been assigned as 11.4% and the exposure variance is 5.84%. So, 5.84%/11.4%=0.5122 sigma units as depicted in element 150. This value is then rounded in order to quickly determine, using the lookup table depicted in FIG. 4, to what percentile this number corresponds. Rounding 0.5122 to the nearest two-digit decimal number results in a rounded exposure variance in sigma units of 0.51 as depicted in element 152 of FIG. 3b.

The next step is to determine a safe score using a table lookup 134. The table shown in FIG. 4 is the same as the table shown in FIG. 10 of the above-identified patent application Ser. No. 10/944,593 filed Sep. 17, 2004. As explained more fully in the above-identified patent application, valuation variances as measured in sigma units are the variances (to then be split into certain percentiles), divided by the forecast standard deviation (which results in them being "in sigma units") for that property or group of properties. In the previous application Ser. No. 10/944,593 filed Sep. 17, 2004, the sigma units were used to determine percentiles. However, in the present invention, a precalculated table or database like the one in FIG. 4, is used along with the sigma unit value calculated herein. This precalculated database in the preferred embodiment, would literally include every property for which data could be obtained in a nation. A large (and positive) exposure variance in sigma units results in a larger percentage of those potential true values being safe.

Referring now to FIG. 4, using a precalculated percentile distribution table of variance of automated valuation model valuations measured in sigma units table as depicted, the percentile associated with the above sigma units value may be determined. In the preferred embodiment, these tables are calculated monthly or quarterly for the entire nation. Alternatively, different update time-frames may be used, such as semi-annually or annually. Further alternatives, though less accurate, may calculate tables similar to the one depicted in FIG. 4, but for smaller groups of properties. These would be less accurate, because they would contain fewer properties and thus be less accurate representations of the variances as measured in sigma units. In the example table depicted in FIG. 4, the sigma units value of 0.511 lies between the $77^{th}$ (in element 154) and the $78^{th}$ (in element 156) percentiles. Using linear interpolation, a more exact value could be found. In this example, we will assume that it is at the $78^{th}$ percentile.

Figure 5:
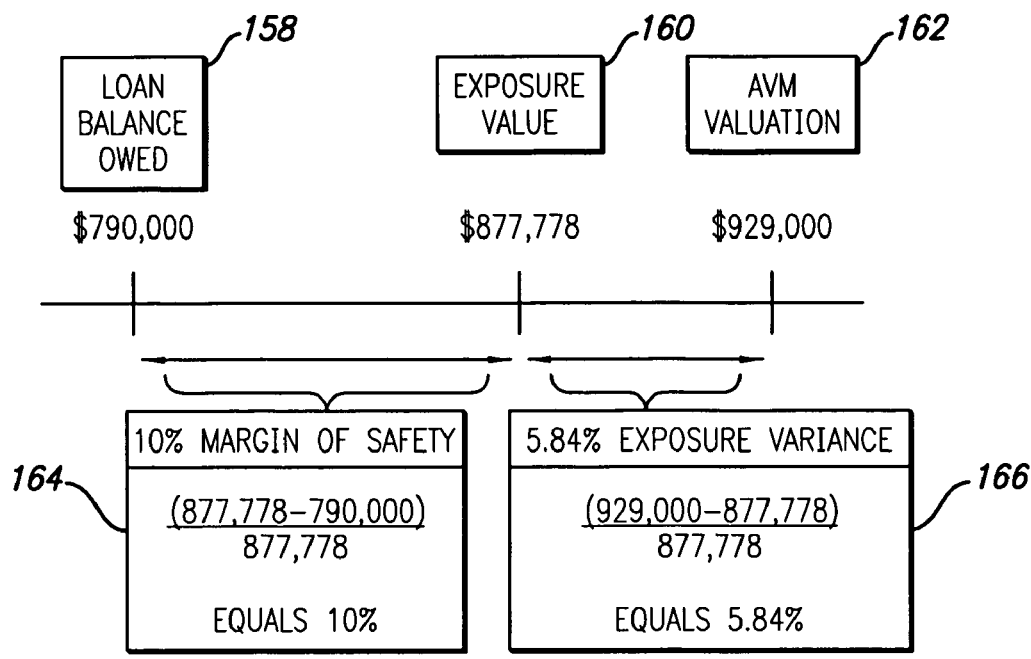
FIG. 5 is a representation of the "margin of safety," actual value and automated valuation.

Referring now to FIG. 5, the steps depicted above numerically and using tables may also be displayed graphically. The loan balance of $790,000 is depicted in element 158 along with the automated valuation in element 162. The exposure value, using a margin of safety of 10%, is calculated in element 164 and depicted in element 160 as being $877,778. The exposure variance is calculated in element 166 as being equal to 5.84%. This 5.84% is the percentage difference, with reference to the calculated exposure value between the exposure value and the automated valuation model valuation.

Figure 6:
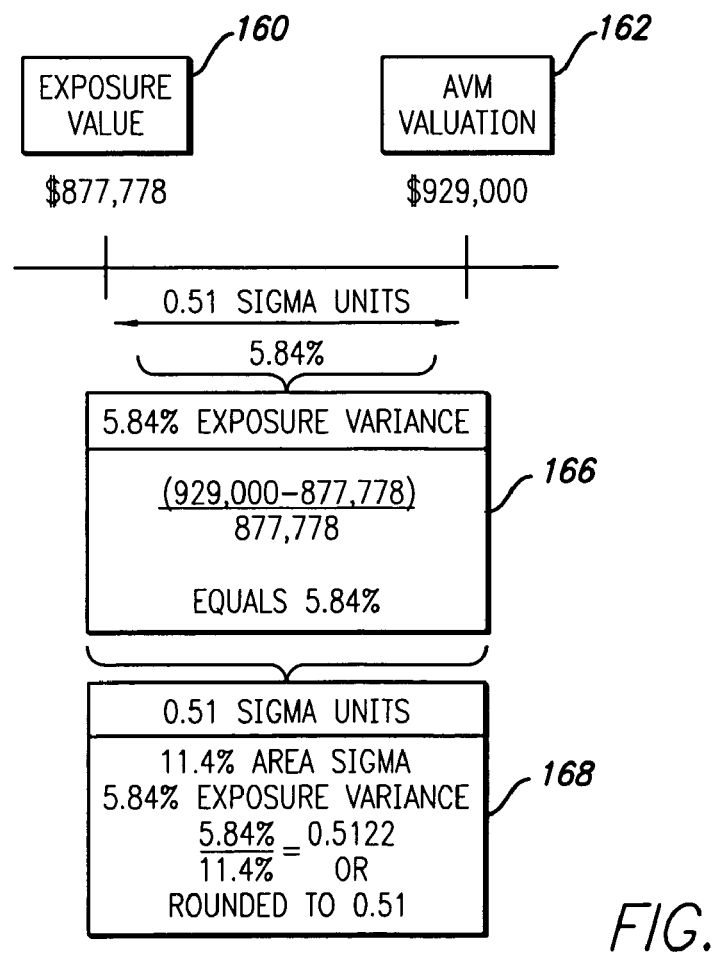
FIG. 6 is a pictorial representation of the "margin of safety," actual value and automated valuation including data in sigma units.

Next, referring to FIG. 6, the same exposure value of $877,778 is depicted in element 160, the automated valuation model valuation of $929,000 is depicted in element 162. The exposure variance of 5.84% is depicted and calculated in element 166, by subtracting the automated valuation model valuation of $929,000 from the exposure value of $877,778 and then dividing that value by the same exposure value of $877,778. In the final step in deriving the value in sigma units, the exposure variance of 5.84% is divided by the precalculated sigma for the area, which is 11.4% in this case. This results in a exposure variance of 0.51 in sigma units. This variance is then looked-up in a table similar to the one depicted in FIG. 4 to determine the relevant percentile. In this case, the percentile is between the $77^{th}$ and the $78^{th}$ percentile. For purposes of this example, we will assume that the value, as above, is at the $78^{th}$ percentile.

Using this percentile and exposure variance in sigma units, the lender may develop some understanding of the risk of outstanding loans held. The lender cannot know the true value of the subject property without first selling the property. However, the exposure variance is known, given that the outstanding loan amount is known and the automated valuation model valuation is known, and hence the variances in sigma units for this automated valuation model in a given geographic area are known. Therefore, using the calculated exposure variance in sigma units, of 0.51 as depicted above, the lender does know several things about this property. First, the lender knows that if the true value (the value of the property if sold) is greater than the exposure value of $877,778, then the exposure variance in sigma units will be less than 0.51, potentially even going negative if the true value is greater than the automated valuation model valuation, which is considered to be fixed at $929,000. Conversely, the lender knows that if the true value of the subject property is less than $877,778, the exposure variance in sigma units will be greater than 0.51, considering the automated valuation model valuation to remain fixed at $929,000.

If the true value is greater than $877,778, then the exposure variance in dollars will be less, because the true value will be closer to the automated valuation value. This will also decrease the exposure variance in sigma units to something less than 0.51 potentially even going negative if the true value exceeds the automated valuation value of $929,000. So, for example, if the true value of the property is actually above the automated valuation model valuation of $929,000 in the example, then the exposure variance, both in value and in sigma units will be negative. This would mean that there is likely to be far more than sufficient value to cover the loan value and the lender's margin of safety. This situation is good for the lender. Conversely, if the automated valuation model valuation is $929,000 and the true value is less than $877,778, then the exposure variance in dollars will be more than it was before, because there is a greater difference between the automated valuation model valuation and the true value. In such a case, then it will result in a variance in sigma units of more than 0.51. This situation is bad for a lender, meaning that there may be less than sufficient value to cover the loan should the property default.

The calculated exposure variance in sigma units for the subject property also demonstrates the property described above, the characteristic of monotonicity. This means that the value of 0.51 in sigma units is a pivot point between good (positive for the lender) and bad (negative for the lender) situations. Therefore, any exposure variance in sigma units greater than 0.51 is a bad situation for the lender and any exposure variance in sigma units less than 0.51 is good for the lender. If the exposure variance in sigma units is greater than 0.51, then this means that there is greater potential that the property may be worth less than the total loan amount plus the margin of safety. Conversely, if the exposure variance in sigma units is less than 0.51, then this means that the property is more likely to be worth at least as much as the total loan amount plus the margin of safety. As described above, using the table in FIG. 4 and the sigma units exposure variance of 0.51, the percentile is determined to be approximately 78. This means that approximately 78% of valuation variances in sigma units were 0.51 or less. This means that the "safe score" for this property at the calculated margin of safety is 78.

Figure 7:
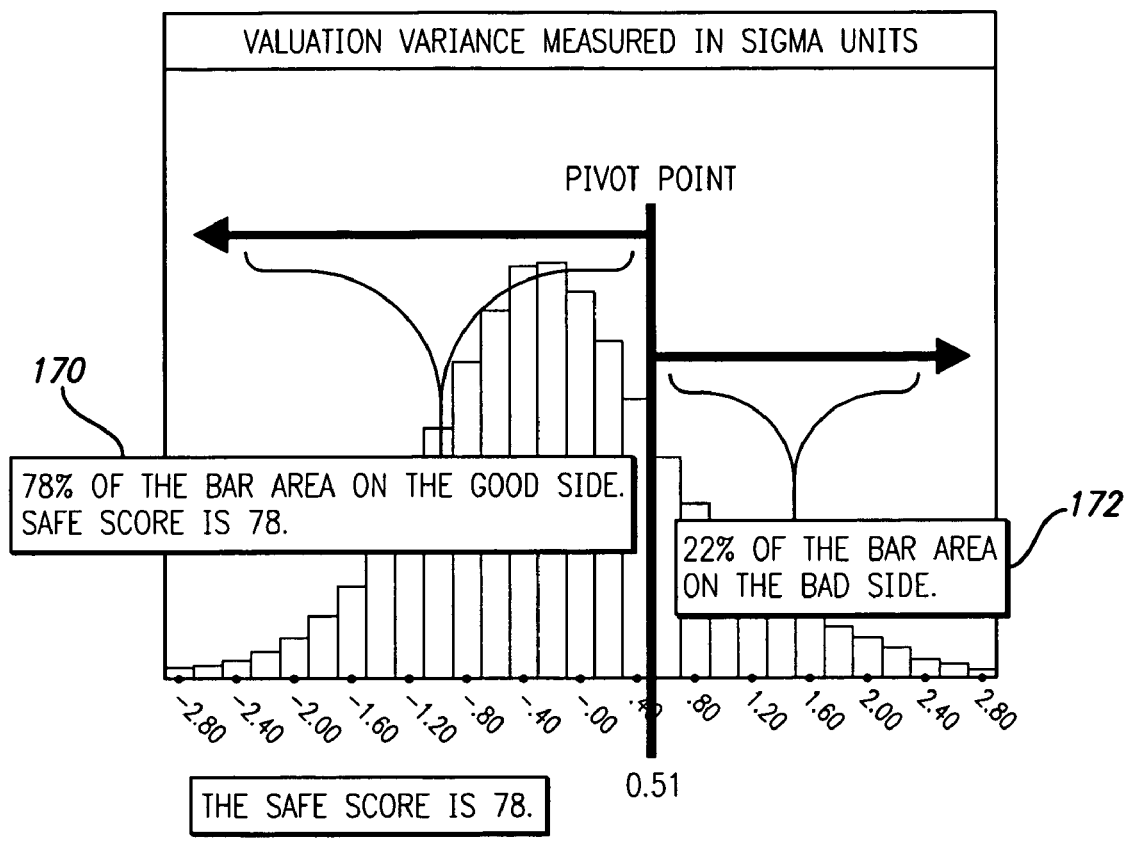
FIG. 7 is a graphical depiction of the data displayed in FIG. 4 with specific reference to an example case.

Referring now to FIG. 7, a depiction of the distribution of valuation variances measured in sigma units is shown. This is a graph of the data depicted in FIG. 4. In the example, the pivot point of 0.51 in element 170 is shown. This corresponds to a point, using FIG. 4, where 78% of the total area is on the side good for the lender and 22% of the area is on the side bad for the lender. This is a representation that for this automated valuation for the subject property, there is a greater likelihood of being "safe" given the lender's margin of safety and the data provided in this example than being "exposed."

This safe score of 78 does not represent a probability that the loan will be repaid, or a probability of default. It is only a representative score, where higher is better, of how safe a lender is in continuing to hold this loan for whatever reason. Therefore, this representation is only useful when compared with other safe scores. However, it is a useful one in determining which loans are safer than others to hold. The range of this safe score may be from zero to one hundred, though artificial limits are imposed in the preferred embodiment between either 5-95 or 10-90. For purposes of lender use, the end result of these calculations is clear: high safe scores are good for the lender and low safe scores are bad for the lender.

The benefits to a lender of this process are manifold. First and foremost, it may be done quickly. There is no need to appraise a property or to make any effort to determine the accuracy of that appraisal. The safe scores can be computed and examined every month or quarter, quickly and inexpensively. The method of this invention takes into account the fact that there are some inaccuracies in automated valuations and adjusts accordingly. The automated valuation model valuations, the forecast standard deviations (Sigmas), and the variance in sigma units tables, will have been computed before any request is made for the data pertaining to a particular property. Thus, the computing time and cost needed to gather these two pieces of data for this method is negligible. Therefore, this method is extremely fast and inexpensive. The inputs needed to begin this process are simple and easy to obtain for a lender and in the preferred embodiment only require: outstanding loan balance and margin of safety for a subject property. The safe score is very sensitive to differences in loan balances, automated valuation model valuation, automated valuation model valuation accuracy, and margin of safety. Finally, the measure is easy to understand, so lenders will be able to readily compare safe scores for a myriad of individual properties or groups of properties.

Referring now to FIG. 8a, another example is depicted. In this case, the sale price of the home as $319,000, as depicted in element 174 and the total remaining loan balance is also $319,000 as depicted in element 176. The automated valuation of this property is $333,000, as depicted in element 178, and the lender's requested margin of safety is 10%, as depicted in element 180.

Referring now to FIG. 8b, the example calculated indicators are depicted as in the step required by element 126 in FIG. 2. The exposure value is calculated by dividing the outstanding loan balance by one minus the margin of safety. In this example, $319,000/(1−0.10)=$354,000 as depicted in element 182. Next, the predetermined sigma associated with a given valuation is looked up, in the preferred embodiment, in an already-calculated and stored database. In alternative embodiments it may be calculated at this point in the process, though it would be very inefficient to do so. In this example, the Sigma is, again, assigned from county-level information as 11.4%. However, in the preferred embodiment, Sigmas are assigned more specifically for individual property valuations based on other factors such as the confidence score of the valuation, the market tier level of the subject property, and other factors. The exposure variance is then calculated by dividing the automated valuation model valuation minus the exposure value by the exposure value. In this example, ($333,000−$354,000)/$333,000=−6.05% as depicted in element 188. To get the exposure variance in sigma units, the exposure variance is divided by the preassigned sigma, whether sigma was assigned as having a single value for a given area or whether it was assigned on a property by property basis or on a basis that was almost property by property due to the finely grained nature of the subcategories of properties used in assigning sigma. In this example, −6.05%/11.4%=−0.5307 as depicted in element 188. This is rounded to two-digits and results in −0.53 as depicted in element 190. The exposure variance in sigma units of −0.53 corresponds to a percentile of variance in sigma units, when looked up in the table depicted in FIG. 4, to the $34^{th}$ percentile as depicted in element 192. This means, as described above, that this loan has a safe score of 34. That is, only 34% of the area under the curve is good for the lender and 66% of the area under the curve is bad for the lender. This is a low safe score. This makes sense because the valuation of the property is only slightly over the value of the entire loan amount. With the addition of a 10% margin of safety, the required exposure value is then actually above the valuation of the property that was estimated by the automated valuation model. However, using the logic described in the invention with application Ser. No. 10/944,593 filed on Sep. 17, 2004 owned by the assignee of this application, one could speak of a represented probability of 34% that the true value is equal to or greater than the exposure value.

Figure 9:
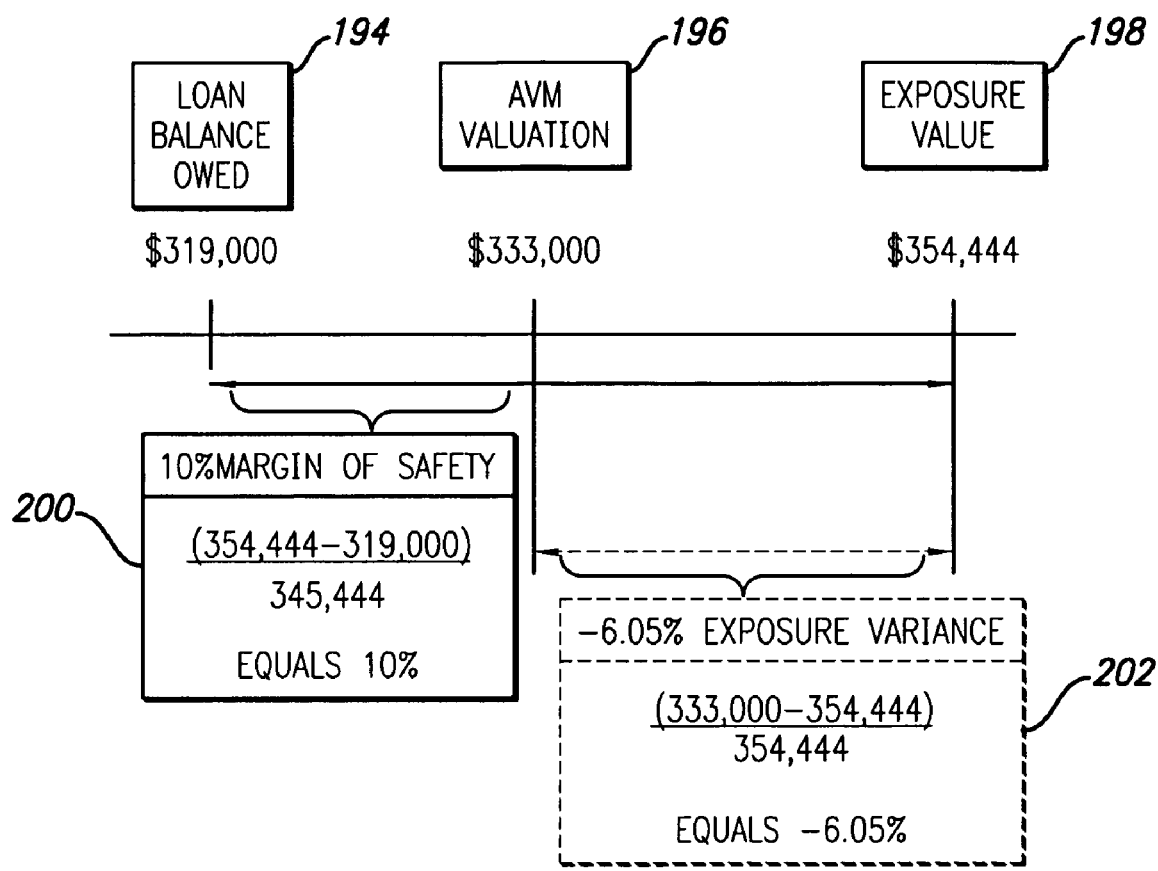
FIG. 9 is a representation of the "margin of safety," actual value and automated valuation in the additional example case.

Referring now to FIG. 9, the steps described in the preceding example may also be depicted graphically. The loan balance of $319,000 as described in the example above is depicted in element 194. The automated valuation model valuation of $333,000 is depicted in element 196. The exposure value of $354,000, which is ($319,000/(1−0.10)), is depicted in element 198. The calculation of this exposure value is depicted in element 200. This exposure value and automated valuation results in an exposure variance of −6.05%, because the automated valuation is $21,000 less than the calculated exposure value.

Figure 10:
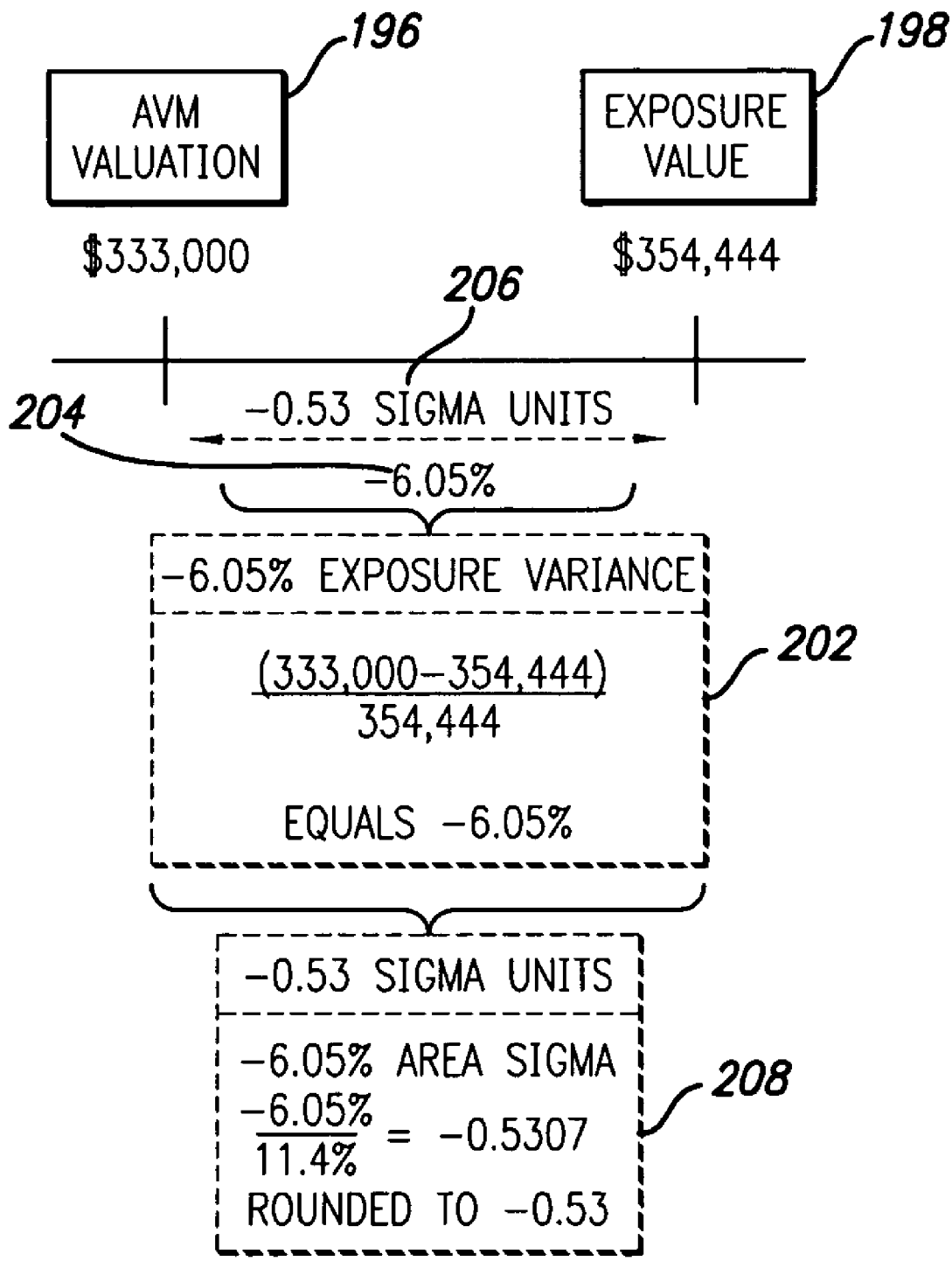
FIG. 10 is a representation of the "margin of safety," actual value and automated valuation including data in sigma units in the additional example case.

Referring next to FIG. 10, the automated valuation 196 is depicted again along with the exposure value 198. The exposure variance is depicted at −6.05% in elements 202 and 204. In element 208, the calculation of the −0.53 sigma units is depicted. The exposure variance 202 of −6.05% is divided by the predetermined Sigma (in this case assigned as equal across the county as 11.4%) as depicted in element 206. The result is −0.5307 and is rounded to −0.53 as further depicted in 208. This value is used in the area percentile table of variance measured in sigma units table depicted in FIG. 4. This approximate variance in sigma units is found in element 192 of FIG. 4 at a percentile of 34. This means that the "good" portion of the loan in this case is only 34% and that the "bad" portion of the loan is 66%. Therefore, the Safe Score is 34.

Figure 11:
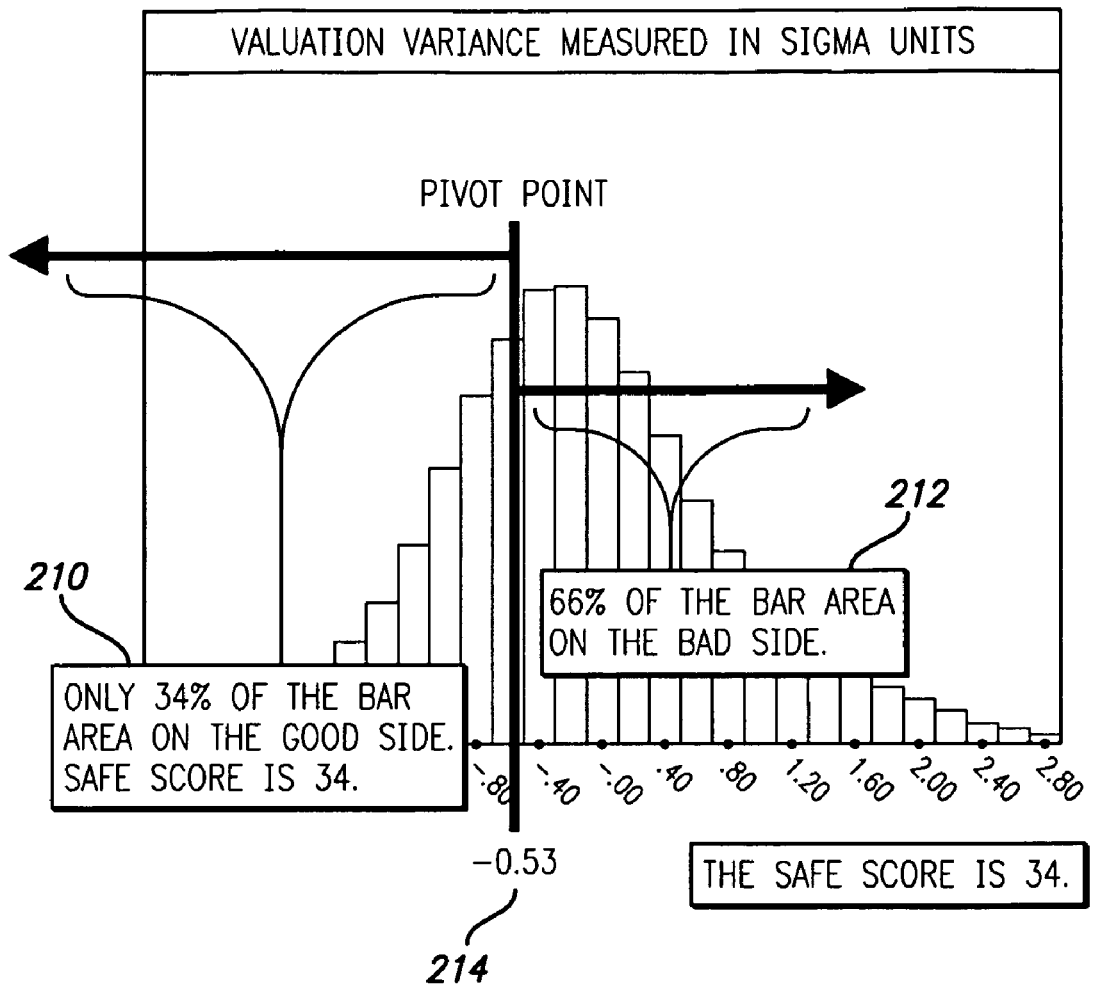
FIG. 11 is a graphical depiction of the data displayed in FIG. 4 with specific reference to the additional example case.

These percentages can be seen more readily in FIG. 11. FIG. 11 is a graphical depiction of the area percentile table of variance measured in sigma units table. The sigma-unit-value of −0.53 falls well to the left of (less than) the middle of the curve. When the value is drawn on the graph, as it is in element 214, the "good" portion 210 is only 34% of the area, while the "bad" portion is 66% of the area as depicted in element 212. The distribution of valuation variances in sigma units is not theoretically calculated but is empirically measured from a previous and large study as described in the co-pending application entitled Method and Apparatus for Constructing a Forecast Standard Deviation for Automated Valuation Modeling application Ser. No. 10/944,593 filed on Sep. 17, 2004. This means that it may be expected that more than half of the potential true values of the property are below the exposure value, 66% of them to be exact. However, 34% of the potential true values of the property are above the exposure value.

In the preferred embodiment, this method and apparatus will not be used to provide loan diagnostics for only one property or loan. Instead, the loan diagnostic analytics will be used on a large group of properties. However, in alternative embodiments, the use of this method and apparatus may be applied only to a single property in order to determine the risk of exposure associated with a particular individual loan. A very powerful use of the method of this invention is to use the invention on multiple properties simultaneously. The forecast standard deviation invention, used in this invention, is a forecast of the standard deviation of each automated valuation model valuation, based on past data, that is used to predict the variation around the automated valuation model valuation of the true value of each property.

When the method of this invention is used many times for many subject properties for which the data is aggregated, the law of averages will even-out most potential discrepancies. So, for example, if an automated valuation model has an individual standard error of 11% for a single property in a predetermined geographic area, then the average error for 100 properties in the same predetermined geographic area, will be only 1.1% (11% divided by the square root of 100), and for 10,000 properties will be 0.11% (11% divided by the square root of 10,000).

In the preferred embodiment, collective diagnostics are calculated by performing the method of this invention on each property individually within a portfolio of properties, then by taking the mean and median safe scores of those properties to create a collective score. Alternatively, the mean and median scores may be calculated using a weighted mean and median. The weighted mean and median may be calculated by weighting the loans according to their dollar or percentage value within a particular group of loans. Alternatively, they may be weighted according to the date when the loans will be fully repaid or some other weighting measure relevant to the lender or loan-holder. Additional diagnostic measures other than a mean and median safe score may be calculated, such as a safe value, by multiplying the total loan value of a portfolio times the percentage of "good" or "bad" represented by the safe score to calculate a "good part" or "bad part" respectively. A "bad part" ratio may also be calculated by dividing the total "bad part" by the total loan value of a property, portfolio of properties or group of properties.

The calculation of a "bad part" ratio uses the data generated, either individually or in aggregate, in creating a safe score. The bad part ratio is simple to calculate for an individual property, it is simply the amount of the "bad part" of the total loans on that property divided by the total loan amount on that property. The bad part ratio equation is as follows:

$$((1-SS)*TLA)/(TLA)$$

Where:
SS is a safe score, namely an indicator of the potential exposure should the loan go into default described as a percentage, represented as a decimal value from 0 to 1; and
TLA is the total loan amount, namely the total of all loans outstanding on a said property.
If SS were to be represented as a number from 0 to 100, the equivalent formula would be:

$$((100-SS)*TLA)/(100*TLA)$$

The "bad part" in the original (first) equation is the numerator: $(1-SS)*TLA$, where SS, the Safe Score, is taken as a percentage or decimal from 0 to 1. The "bad part" in the second equation is the numerator:
$((100-SS)*TLA)$, where SS, the Safe Score, is taken as a number from 0 to 100.

For a group of properties, it is the aggregate total "bad part" divided by the aggregate total loans on the properties. The bad part is calculated for a group of properties using the formula:

$$\Sigma((1-SS)*TLA)/\Sigma(TLA)$$

Where:
SS is a safe score, namely an indicator of the potential exposure should the loan for each property in said subject group of properties go into default described as a percentage, represented by a decimal value from 0 to 1; and
TLA is a total loan amount, namely the total of all loans outstanding for each property in the subject group of properties. The summation of these values is the total loan amount on the group of properties.
If SS were represented as a number from 0 to 100, then the "bad part ratio" would be given by the equivalent formula:

$$\Sigma((100-SS)*TLA)/\Sigma(TLA*100).$$

Again, the "bad part" of the loans aggregated is the numerator of the above equation: $\Sigma((1-SS)*TLA)$, using the original (first) formula, taking the Safe Score to be represented as a decimal or percentage from 0 to 1.

As this ratio decreases, the loans will generally have a higher safe score. This "bad part" number has that inverse relationship to the mean safe score for an aggregation of properties, but may not move directly along with the mean safe score. For example, several properties with small values and loan balances may be almost completely "bad" but the total mean safe score may be very high. These loans, dependent upon their size, may make the aggregate "bad part" and "bad part" ratio better or worse than the mean safe score would suggest. Alternatively, there may be many loans with almost no bad part, while the mean safe score is still relatively low due to some significant and large bad loans. This could result in a lower or higher mean safe score for the group of properties but also a lower or higher "bad part" and "bad part" ratio, depending on how the loans and their "bad parts" were counted or weighted. Therefore, the mean safe score and the "bad part" and "bad part" ratios may or may not be directly related to one another. The "bad part" is an aggregate built from the total set of properties in the group using their loans and valuations whereas the mean safe score is an average of the safe scores for each property.

Good or bad portions or safe scores are both synthetic indices, having no absolute statistical meaning. There is no indication, even on the portfolio level, that a particular portion of a loan group will be defaulted upon or a particular portion will be repaid. The indices, however, do demonstrate two particularly useful properties. One property is monotonicity, that is, the larger the good portion, the lower risk of exposure loss in the loan or group of loans. Conversely, the higher the bad portion, the higher the risk of exposure loss in the loan or group of loans. Second, this synthetic score is useful in comparing loans or groups of loans as a measure of risk of exposure and measure of loss in the case of a default. Conversely, these synthetic scores are also useful in comparing loans or groups of loans to test for the possibility that borrowers will refinance their loans and/or seek additional mortgage credit, with the existing lender or elsewhere. If a safe score is low, the loan may be risky and prone to loss in the event of a default. If a safe score is high, the loan may not be risky, but the borrower may have a high amount of equity in the home and be prone to seek refinancing or additional borrowing.

Referring now to FIG. 3c, the first example subject property "bad part" calculation is depicted. The property has a safe score, as is shown above, of 78. When represented as a percentage in decimal form, this number is 78% or 0.78, as shown in element 145. The total loan amount, as seen in FIG. 3a, is $790,000, also depicted in element 147. In order to calculate the "bad part" and "bad part" ratio, the equation for a single property described above is used. First, the "bad part" is (1−SS)*TLA; where SS is the safe score as a percentage in decimal notation and the TLA is the total loan amount on the property. For properties with multiple loans, the TLA will be the aggregate of those loans.

Next, the "bad part" is computed, using the values from the property. The safe score of 78 and the total loan amount of $790,000 are put into the equation: (1−0.78)*790,000=$173,800; as depicted in element 149. This $173,800 is the total "bad part" of the loan. That is, it is the amount that may fall outside of the "good part." To calculate the "bad part" ratio, this value is simply divided by the total loan amount, as shown in element 151. The value in this case is 0.22, depicted in element 151. This is the same, for a single property, as one minus the numeric safe score taken as a decimal; in other words, it is identical to the "bad score." As will be seen, for groups of properties, this may or may not be the case.

Referring now to FIG. 8c, an additional "bad part" calculation is depicted. This calculation is depicted for the second single-property example. In element 183, the calculated safe score of 34 or 0.34 is depicted. Also depicted is the total loan amount on the property of $319,000 in element 185. First, the "bad part" is calculated, using the numerator of the above equation: (1−SS)*TLA. For this example, the values are (1−0.34)*$319,000, which equals $210,540. This $210,540 is the amount of the loan, in dollar value, that is "bad." To calculate the "bad part" ratio for this single property, the "bad part" is divided by the total loan amount. Therefore, using the numbers of this example: 210,540/319,000 is equal to 0.66, which is the "bad score" expressed in decimal form, and is equal to 1 minus the decimal expression of the Safe Score of 0.34. Again, for a single property, this is the same as 1−SS (where SS is the decimal representation of the percentage safe score). However, it may or may not be the case for groups of properties that one minus the mean (or median) safe score is the "bad part" ratio.

Referring now to FIG. 12, by way of an example, a table of safe score data concerning a large set of properties, consisting of all the single-family homes sold in Orange County, Calif. during 2004, is depicted. In this figure, the data is divided by purchase quarters in 2004 from purchase quarter one, from January through March, depicted in element 216, to purchase quarter four, from October through December, depicted in element 218. All automated valuations used were performed early in 2005. The mean and median safe scores for quarters one through four are depicted. For example, the mean safe score for quarter one in element 220 is 86.32, whereas the mean safe score for quarter four in element 222 is 63.24. These scores indicate that, overall, for loans in Orange County, Calif. the loans that are approximately one year old are "safer" than loans that are only three months old. This may largely be attributed to the fact that many of the properties sold in quarter one of 2004 have had almost one year to appreciate in value and the purchaser of those properties has had almost a year to lower the owed balance on those homes. The loans that are only approximately three months old, made in quarter four have a much lower safe score, largely due to the fact that the properties for which these loans have been made have had such a short time to appreciate in value. Appreciation in an upward-trending market will be significant in avoiding "bad" safe scores. On the other hand, in downward-trending markets, recent purchases will likely have greater safe scores than properties less recently purchased.

Still referring to FIG. 12, the median safe score of 96.33 in element 224 for quarter one and 71.33 in element 226 for quarter four are also depicted. The total "bad part" for quarter one is $692,020,681, as depicted in element 228, of the total loan value. In quarter four, the total "bad part" is $739,136,150. The numbers in quarters two and three are both larger, but to see the real value of these numbers, the "bad part" ratio is a better indicator. As can be seen by comparing "bad part" ratios, the "bad part" is considerably less, consistent with the mean and median safe scores, in quarter one as can be seen in the 0.14 ratio in element 232, than the "bad part" in quarter four, depicted as the 0.37 ratio in element 234.

To calculate the "bad part" ratio in this example, each of the properties' "bad parts" are first taken and summed and then the total loan amounts are summed. The total bad part is then divided by the total loan amount. To calculate the total "bad part" ratio the safe score and total loan amounts for each property are used in the equation: $\Sigma((100-SS)*TLA)/\Sigma(TLA*100)$ if the Safe Score is taken as a number from 0 to 100. If the Safe Score is taken as a decimal or percentage from 0 to 1 the formula is: $\Sigma((1-SS)*TLA)/\Sigma(TLA)$. So, using this equation, the total bad part for quarter one is $692,020,681, as depicted in element 228, and the total loan amount is $4,912,201,020, depicted in element 229. These numbers are both the summations of the bad parts and total loan amounts for each of the subject properties, in this case 10,582 subject properties, as depicted in element 231. The division $692,020,681/$4,912,201,020 results in 0.14087. This, rounded to two decimal places is a "bad part" ratio of 0.14 or 14%, depicted in element 232.

Alternatively, for purchase quarter 4, depicted in element 218, the total bad part, the aggregation of each property's individual bad part, is $739,136,150, depicted in element 230 and the total loan amount is $1,975,260,319, as depicted in element 233. The total number of properties in this group was 4,157, as depicted in element 235. When $739,136,150 is divided by $1,975,260,319, the result is 0.37419. This is rounded to two decimal places which results in the 0.37 or 37% "bad part" ratio depicted in element 234. Similar calculations are performed for each group of properties to determine their respective "bad part" ratios.

Referring now to FIG. 13, a table depicting bad part calculations for multiple properties is depicted. In this example, five properties are used. Using the methodology described above, the safe score for each property is calculated individually. For example, for property 1, the safe score is calculated to be 13.5, as depicted in element 237. Next, the bad part is calculated by multiplying one minus the safe score (where the safe score is thus considered as a decimal, in this case 0.135) times the total loan amount. For this property, one minus the safe score is depicted as a decimal in element 239 as 0.865. The total loan amount is $386,500, as depicted in element 241. The total bad part, using the calculation described above, is these two numbers multiplied together, or $334,323, depicted in element 243. For another single-property example, the safe score for property 3 is 25, as depicted in element 245. The bad part is one minus the safe score (the safe score expressed as a decimal), which is 0.75, as depicted in element 247, times the total loan amount, which is $546,250 as depicted in element 249. Therefore, using the equation described above, the total bad part for this property is $409,688 as depicted in element 251 since $409,688=0.75 times $546,250.

Once these calculations are made for each property in a group of properties, then the "bad part" and "bad part" ratios may be calculated for that group of properties. In this example, only five properties are used. This is done to more simply demonstrate what is done on a large-scale basis in the preferred embodiment of the invention. In actual practice, the method of this invention is used on thousands of properties at once to arrive at very accurate "bad parts" for huge groupings of securitized loans or properties in a given location.

Once the "bad parts" have all been calculated, they are summed. This results in a complete numerator of the equation: $\Sigma((1-SS)*TLA)/\Sigma(TLA)$; where SS is the safe score (having been expressed as a decimal from 0 to 1 in this formula) for each property in the group and TLA is the total loan amount for each property in the group. If the Safe Score was expressed as a number from 0 to 100, the equivalent formula would be: $\Sigma((100-SS)*TLA)/\Sigma(TLA*100)$.

The calculation $\Sigma((1-SS)*TLA)$ is the sum of the "bad parts" used in the numerator. In this example, the sum of the "bad parts" is depicted in element 255 as $1,084,440. Next, the sum of all of the total loan amounts for the group of properties is calculated. In this example, the total loan amount for the group of properties is $2,593,450, as depicted in element 253. This is the denominator of the above equation. Finally, the "bad part" is divided by the total loan amount to calculate the "bad part" ratio. This is $1,084,440/$2,593,450 which equals 0.418, as depicted in element 257. This is the "bad part" ratio for this group of properties Referring now to FIG. 14, a similar chart is shown for another large set of properties and loans, the entire set of single-family homes sold in Denver County, Colo. in the year 2004. In quarter one, shown in element 236, the mean safe score is 62.76, depicted in element 240. Quarter four, depicted in 238, has a mean safe score of 61.08. The values for quarters two and three are also similar. This market is experiencing much less substantial price-appreciation than the Orange County, Calif. market. As a result, the mean safe score does rise from recent quarters going back to quarters farther in the past, but at a much slower pace. The "bad part" ratios for quarters one and four depicted in elements 244 and 246 respectively are also generally decreasing, but have not changed as substantially as those in FIG. 12, elements 232 and 234. Generally, the markets depicted in FIGS. 12 and 14 are different in that the rapid price appreciation for properties in southern California during this time-period compared to the relatively stable market in Denver County, Colo. has created different results over the course of one year.

The safe scores calculated for each property, portfolio or area provide the means to objectively evaluate the exposure risk of one property or set of properties as compared to another. The safe scores are affected most by (1) the generosity or conservatism in the initial lending criteria, the increase or decrease in property value over time, the lender's desired margin of safety, and the accuracy of the automated valuation model in each market. Other potential diagnostics could include the percentage of properties in a portfolio with a safe score under or above a certain number, such as 70. Numerous other diagnostic measures may be constructed to compare portfolios or individual properties using the safe score measure. Several of these different ways to compare safe score measures will be depicted in the following figures.

Referring now to FIGS. 15 and 16, additional diagnostics may created by subdividing the safe score data in a portfolio, geographic area, loan value or automated valuation model valuation by quartiles or deciles of loan value, or of sale price, or of valuation, or of some other variable. In FIG. 14 for example, the county of Los Angeles, Calif. is depicted, subdivided by quartile. The quartile depicted is the quartile by sale price. In alternative embodiments, different quartile divisions could be used. So, for example, quartile 1, depicted in element 248 has a mean safe score of 65.78, as depicted in element 252. Its total "bad part" is $1,945,434,334 with a "bad part" ratio of 0.40. Quartile 4, as depicted in element 250, has a mean safe score of 79.17, as depicted in element 254. It has a total "bad part" of $3,313,966,115, as depicted in element 258 and a "bad part" ratio of 0.23. This means that the safe score on loans in Los Angeles County, Calif. generally rises as the sale price goes up—from 65.78 to 79.17 across the four quartiles. Additionally, the "bad part" ratio goes down significantly in conjunction with the mean safe score from 0.40 to 0.23 from quartile 1 to quartile 4. Overall, this means that properties with higher sale prices had less risk of exposure in the event of default than lower loan value properties. One reason for this is that higher-priced properties may have appreciated faster than lower-priced properties during the time period under study. Additionally, automated valuation models tend to overvalue lower-value properties. Moreover, the forecast standard deviation for properties at the lowest price quartile will generally be larger, representing less accuracy in valuation, thus more uncertainty will be present and a larger portion of the "bad part" may be present simply because the range is larger. Furthermore, high value properties are usually bought with larger down payments than low value properties. Therefore, these properties likely have more cushion on the "loan amount" initially and the margin of safety may have already been covered by the down payment.

Next referring to FIG. 16, a national safe score table for 2004 is depicted, subdivided by deciles of sale price levels assigned within each county and type of property and then aggregated nationally into ten decile groups. In decile 1 the mean safe score is 75.59, depicted in element 264. The "bad part" ratio is 0.31, depicted in element 270. For decile 6, the mean safe score is 68.23, depicted in element 266. The total "bad part" ratio is 0.34, depicted in element 272. In decile 10, the mean safe score is 76.35, depicted in element 268, and the "bad part" ratio is 0.28, depicted in element 274. The "bad part" ratio generally decreases over the course of the ten deciles, moving up from lower-priced to higher-priced homes. Additionally, the total loan purchase and total "bad part" rises, because the homes are more expensive, but the "bad part" as a portion of the total loan value decreases, as can be seen in the "bad part" ratios. As expected, the safe scores increase over the deciles. This means, generally, that the risk of loss exposure in the event of default is lower for the more expensive properties nationally, similarly to the relationship in FIG. 14.

Referring next to FIG. 17, a safe score table by state in 2004 is depicted. For example, for Arkansas, depicted in element 276, the mean safe score is 56.91, as depicted in element 278. The total "bad part" ratio is 0.45, as seen in element 280. This is a fairly low mean safe score and a fairly high "bad part" ratio. These 2004 loans, on the whole, in the first quarter of 2005 were not particularly free of risk of loss due to exposure in the event of default Additionally depicted in element 282 is Massachusetts. Its mean safe score is 84.16, depicted in element 284 with a "bad part" ratio 286 of 0.17. The loans in Massachusetts made in the year 2004, when checked for risk of loss due to exposure in the event of default in the first quarter of 2005 had the highest safe score of any state. Loans in South Carolina, depicted in element 288, has a mean safe score of 69.91, depicted in element 290 and a "bad part" ratio of 0.33, depicted in element 292. This is a more typical risk of loss to exposure and more typical "bad part" ratio.

Referring next to FIG. 18, diagnostics from two states for each quarter in 2004 are depicted. The two states chosen for this example were California and Colorado. For California in quarter 2, the mean safe score is 73.03, depicted in element 294, and the "bad part" ratio is 0.29, depicted in element 296. In comparison, the mean safe score for Colorado in quarter 2, depicted in element 298, is 57.8 and the "bad part" ratio is 0.43, depicted in element 300. Therefore, loans in Colorado, made in quarter 2, when reviewed in the first quarter of 2005 were, on the whole, more likely to result in loss from exposure in the case of a default on loans. This is likely due in large part to the rapidly-appreciating market in California in 2004-2005 compared with the relatively stable appreciation in Colorado. As the property values appreciate, the likelihood of loss goes down quickly because any sale of the property will likely cover the "margin of safety" described above. This also accounts for the propensity, during the time-frame the data used herein was created, for mean safe scores to go up over time. The real-estate market generally is experiencing growth and appreciation during 2004-2005, especially in California. In recessionary markets, the safe scores could potentially decrease over time.

Referring still to FIG. 19, the mean safe score for quarter 4 in California is 58.40, as depicted in element 302, and the "bad part" ratio is 0.42, as shown in element 304. For Colorado in quarter 4, the mean safe score is 56.08, depicted in element 306, and the "bad part" ratio is 0.47, depicted in element 308. These two safe scores and "bad part" ratios are much more closely aligned, which makes sense. These diagnostics were run in the first quarter of 2005, on loans made in the last quarter of 2004. There has been little time for the property to appreciate in either market or for the owners to "pay down" their loan sufficiently to create equity in the property. Therefore, the safe scores are fairly low for both states and the "bad part" ratios are fairly high at this early stage in the loans' "lives." And the markets in the two states have had relatively little time to grow at different price appreciation rates, thus leaving less room for divergence in safe scores and "bad parts."

Referring next to FIG. 19, the safe scores of each state for quarter 4 of 2004 are depicted. These diagnostics were performed during the first quarter of 2005. For example, in Arkansas, depicted in element 310, the mean safe score is 53.72, depicted in element 312, and the "bad part" ratio is 0.47, depicted in element 314. Similarly, for Massachusetts, depicted in element 316, the mean safe score is 81.87, depicted in element 318, and the "bad part" ratio is 0.19, depicted in element 320. Massachusetts, as before in the full-year table, has one of the better safe scores and "bad part" ratios of the states for the data only in quarter 4. Finally, depicted in element 322, South Carolina has a mean safe score of 63.89, depicted in element 324 and a "bad part" ratio of 0.42, depicted in element 326. These are more typical numbers, as was the case in FIG. 16. The overall mean safe scores tend to be lower in quarter 4 than for properties sold in earlier quarters, because the valuations were performed in the first quarter of 2005 and, as stated above, there has been little time for the properties to appreciate in value. This table, to some degree, also demonstrates the generosity or conservatism of lenders in a particular region. By singling out only one quarter previous, one can better see the safety with which lenders are lending, barring any appreciation in value of the subject properties.

This invention may be used to track the safe scores over time. Lenders in particular or holders of large portfolios of properties may wish to watch safe scores in order to determine which portfolios of properties are the most valuable and which are the least valuable, or have safe scores which are increasing over time. Properties whose safe scores are low or decreasing, should be observed for possible default, and no additional credit should be extended against these properties. Additionally, holders of properties whose loans have high safe scores or steadily increasing safe scores, may be approached for refinancing of those loans or for additional credit borrowing, where holders of properties with low safe scores may require additional investigation prior to issuing additional credit. This intention is also useful to new or refinancing lenders. These lenders may want to approach owners of properties with high safe scores whose loans are with other lenders, for refinancing or additional credit. They may also want to keep watch on their own loans with high safe scores as vulnerable to refinancing with another lender.

Real estate investment trust holders would perhaps be one example of a group of individuals who can benefit from knowing the value of their loans and the safety of each type of loan. Loans could be grouped based upon their safe scores to create bundles that would have a more consistent return on investment depending upon the overall safe score of a bundled portfolio. Using the method of this invention, mortgage loans based on properties or groups of properties with safe scores above a certain number may be more valuable than mortgage loans based on properties or groups of properties with safe scores below a certain number. This invention can thus be useful in aiding the securitization of mortgage-backed investments. For instance, a set of loans with safe scores all from 70 to 80 may be bundled and securitized, with different valuation rules, than a set of loans with safe scores all from 60 to 70. To this end, the method and apparatus of this invention are useful to firms in the financial market engaged in the valuation, buying, and selling of securitized mortgage-backed financial instruments. It is also useful for grouping similarly risky investments together.

It will be apparent to those skilled in the art that the present invention may be practiced without these specifically enumerated details and that the preferred embodiment can be modified so as to provide additional or alternative capabilities. The foregoing description is for illustrative purposes only, and that various changes and modifications can be made to the present invention without departing from the overall spirit and scope of the present invention. The full extent of the present invention is defined and limited only by the following claims.

What is claimed is:

1. A computer-based method of calculating a safe score for a property comprising the steps of:
gathering data related to a property from a database, the data comprising a current loan balance on said property, a margin of safety, an automated valuation of said property, and a forecast standard deviation, wherein the margin of safety is an amount or percentage above the current loan balance, and the forecast standard deviation is a forecast of a standard deviation for an automated valuation model used to generate the automated valuation of said property;
calculating, using a processor, an exposure value for said property using the current loan balance on said property and the margin of safety;
calculating, using the processor, an exposure variance for said property using the automated valuation of said property and the exposure value;
converting, using the processor, said exposure variance for said property into sigma units using the forecast standard deviation and the exposure variance, wherein the sigma units is a measure indicating a likelihood that a true value of the property is greater than or less than the exposure value; and
determining, using the processor, a safe score using the converted exposure variance in sigma units.

2. The method of claim 1, wherein said steps are repeated for each property in a subject group of properties.

3. The method of claim 2, wherein said safe scores are averaged to create a median safe score for said subject group of properties.

4. The method of claim 2, wherein said safe scores are averaged to create a mean safe score for said subject group of properties.

5. The method of claim 1, wherein said exposure variance is:

(automated valuation−exposure value)/exposure value.

6. The method of claim 1, wherein said converting step is accomplished by dividing said exposure variance by the forecast standard deviation.

7. The method of claim 1, wherein said safe score is the percentage of potential true valuation variances in sigma units less than said exposure variance in sigma units.

8. The method of claim 1, wherein said determining step is accomplished by calculating the percentile of the exposure variance measured in sigma units.

9. The method of claim 1, wherein said determining step is accomplished by using a lookup table of percentile table of variance measured in sigma units.

10. The method of claim 1, further comprising the step of calculating, using the processor, the good and bad portions of a loan for said property.

11. The method of claim 1, further comprising the step of calculating, using the processor, a bad part ratio.

12. The method of claim 11, wherein the bad part ratio is:

((1−SS)*TLA)/TLA wherein:
SS is a safe score, namely an indicator of the potential exposure should the loan go into default described as a decimal number from 0 to 1.00; and
TLA is the total loan amount, namely the total of all loan balances owed outstanding on said property.

13. The method of claim 2, further comprising the step of calculating, using the processor, a bad part ratio.

14. A computer-based apparatus for calculating a safe score for a property comprising:
database connector means connected to a temporary data storage means for receiving data related to a property the data comprising a current loan balance on said property, a margin of safety, an automated valuation of said property, and a forecast standard deviation,
wherein the margin of safety is an amount or percentage above the current loan balance, and the forecast standard deviation is a forecast of a standard deviation for an automated valuation model used to generate the automated valuation of the property, the forecast standard deviation being calculated using valuation differences between an automated valuation of each property in a set of properties and a true value of each property in the set of properties,
automated valuation model connector means connected to said temporary data storage means for receiving automated valuations of said property;
calculation means connected to said temporary data storage means for calculating an exposure value for said property using the current loan balance on said property and the margin of safety, for determining a pivot point for said property, for calculating an exposure variance for said property using the automated valuation of said property and the exposure value, and for converting the exposure variance for said property into sigma units using the forecast standard deviation and the exposure variance, wherein the sigma units is a measure indicating a likelihood that a true value of the property is greater than or less than the exposure value; and
database connector means further connected to said calculation means for receiving percentiles in sigma units to thereby determine a safe score.

15. The apparatus of claim 14, wherein the calculation means further comprises an aggregation means for calculating aggregate safe scores for a subject group of properties.

16. The apparatus of claim 14, wherein said exposure variance is:

(automated valuation−exposure value)/exposure value.

17. The apparatus of claim 14, wherein said exposure variance in sigma units is the exposure variance divided by the forecast standard deviation.

18. The apparatus of claim 14, wherein said safe score is the percentage of potential true valuation variances in sigma units less than said exposure variance in sigma units.

19. The apparatus of claim 14, wherein said calculation means further calculates the good and bad portions of a loan for said property.

20. The apparatus of claim 14, wherein said calculation means further performs the step of calculating a bad part ratio.

21. The apparatus of claim 20, wherein said bad part ratio is:

((1−SS)*TLA)/(TLA)

wherein:
SS is a safe score, namely an indicator of the potential exposure should the loan go into default described as a percentage represented by a decimal number from 0 to 1.00; and
TLA is the total loan amount, namely the total of all loans outstanding on said property.

22. The apparatus of claim 15, wherein said calculation means further performs the step of calculating a bad part ratio.

* * * * *